United States Patent
Beale et al.

(10) Patent No.: US 12,471,022 B2
(45) Date of Patent: Nov. 11, 2025

(54) COMMUNICATIONS DEVICES, INFRASTRUCTURE EQUIPMENT AND METHODS

(71) Applicant: Sony Group Corporation, Tokyo (JP)

(72) Inventors: Martin Warwick Beale, Basingstoke (GB); Kazuyuki Shimezawa, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 625 days.

(21) Appl. No.: 17/795,882

(22) PCT Filed: Feb. 15, 2021

(86) PCT No.: PCT/EP2021/053665
§ 371 (c)(1),
(2) Date: Jul. 28, 2022

(87) PCT Pub. No.: WO2021/165208
PCT Pub. Date: Aug. 26, 2021

(65) Prior Publication Data
US 2023/0072047 A1    Mar. 9, 2023

(30) Foreign Application Priority Data

Feb. 17, 2020   (EP) .................................... 20157802

(51) Int. Cl.
*H04W 52/02*    (2009.01)
*H04W 72/02*    (2009.01)
(Continued)

(52) U.S. Cl.
CPC ....... *H04W 52/0229* (2013.01); *H04W 72/02* (2013.01); *H04W 72/0446* (2013.01); *H04W 92/18* (2013.01)

(58) Field of Classification Search
CPC ............. H04W 52/0229; H04W 72/02; H04W 72/0446; H04W 92/18
See application file for complete search history.

(56) References Cited

U.S. PATENT DOCUMENTS

2011/0244913 A1*  10/2011  Kim ........................ H04B 5/79
                                                     455/522
2016/0007406 A1*  1/2016  Yi ......................... H04W 24/02
                                                     370/252

(Continued)

FOREIGN PATENT DOCUMENTS

WO    2016/089294 A1    6/2016
WO    2018/202751 A1    11/2018
WO    2020/033089 A1    2/2020

OTHER PUBLICATIONS

International Search Report and Written Opinion mailed on May 3, 2021, received for PCT Application PCT/EP2021/053665, filed on Feb. 15, 2021, 10 pages.

(Continued)

*Primary Examiner* — Jamal Javaid
(74) *Attorney, Agent, or Firm* — XSENSUS LLP

(57) ABSTRACT

A communications device comprises transmitter circuitry and controller circuitry configured to configure the transmitter circuitry to transmit signals representing data to one or more receiving communications devices via a sidelink interface forming part of a wireless access interface for device to device communications comprising a plurality of resource pool instances. The wireless access interface may be provided by a wireless communications network, the transmitter circuitry being configured to transmit signals to the wireless communications network when in a coverage area of a wireless communications network.

19 Claims, 15 Drawing Sheets

(51) Int. Cl.
*H04W 72/0446* (2023.01)
*H04W 92/18* (2009.01)

(56) References Cited

U.S. PATENT DOCUMENTS

| | | | | |
|---|---|---|---|---|
| 2016/0094326 A1* | 3/2016 | Moon | ............... | H04L 5/14 370/330 |
| 2017/0245319 A1 | 8/2017 | Yasukawa et al. | | |
| 2019/0159224 A1 | 5/2019 | Yasukawa et al. | | |
| 2021/0058866 A1* | 2/2021 | Hosseini | ............ | H04B 7/0695 |

OTHER PUBLICATIONS

Holma et al., "LTE for UMTS OFDMA and SC-FDMA Based Radio Access", John Wiley & Sons, 2009, 232 pages.
NTT Docomo Inc., "Revised WID on New Radio Access Technology", 3GPP TSG RAN Meeting #78, RP-172834, Dec. 18-21, 2017, 11 pages.
Sierra Wireless, "Idle Mode Power Efficiency Reduction", 3GPP TSG RAN WG1 Meeting #89, R1-1708311, May 15-19, 2017, 6 pages.
3GPP, "NR; Study on UE Power Saving (Release 16)", 3GPP TR 38.840 V0.1.0, Nov. 2018, pp. 1-24.
3GPP, "Evolved Universal Terrestrial Radio Access (E-UTRA) and Evolved Universal Terrestrial Radio Access Network (E-UTRAN); Overall description; Stage 2 (Release 16)", 3GPP TS 36.300 V16.0.0, Dec. 2019, pp. 1-366.
3GPP, "NR; Medium Access Control (MAC) protocol specification (Release 15)", 3GPP TS 38.321 V15.4.0, Dec. 2018, pp. 1-77.
3GPP, "NR; Study on User Equipment (UE) power saving in NR (Release 16)", 3GPP TR 38.840 V16.0.0, Jun. 2019, pp. 1-74.

* cited by examiner

COMMUNICATIONS DEVICES, INFRASTRUCTURE EQUIPMENT AND METHODS

CROSS-REFERENCE TO RELATED APPLICATIONS

The present application is based on PCT filing PCT/EP2021/053665, filed Feb. 15, 2021, which claims priority to EP 20157802.8, filed Feb. 17, 2020, the entire contents of each are incorporated herein by reference.

BACKGROUND

Field of Disclosure

The present disclosure relates generally to communications devices and methods of operating communications devices and specifically to communications devices configured to communicate with other communications device via device-to-device (D2D) communications via a sidelink interface. The present disclosure also related generally to infrastructure equipment forming part of a wireless communications network and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support a wide range of devices associated with different applications and different characteristic data traffic profiles.

One aspect of both LTE and NR wireless communications standards is device-to-device (D2D) communications between two communications devices where some of the signals are not transmitted to or from radio infrastructure equipment of a wireless communications network. Such D2D communications are also referred to as sidelink communications and signals are transmitted directly between communications devices over a sidelink interface. The signals may be transmitted between devices via the sidelink when one or more of the communications devices are within a radio coverage area of the wireless communications network, or also when the communications devices are within a radio coverage area of the wireless communications network.

Providing improvements to D2D wireless communications can present technical challenges.

SUMMARY OF THE DISCLOSURE

The present disclosure can help address or mitigate at least some of the issues discussed above.

Embodiments of the present technique can provide a communications device comprising transmitter circuitry and controller circuitry configured to configure the transmitter circuitry to transmit signals representing data to one or more receiving communications devices via a sidelink interface forming part of a wireless access interface for device to device communications comprising a plurality of resource pool instances. The wireless access interface may be provided by a wireless communications network, the transmitter circuitry being configured to transmit signals to the wireless communications network when in a coverage area of a wireless communications network. Alternatively the sidelink may be configured between communications devices which are out-of-coverage in accordance with a D2D communications interface. The controller circuitry is configured in combination with the transmitter circuitry to transmit or to initiate transmission of a sidelink wake-up signal, SWUS, to the one or more receiving communications devices indicating that the one or more receiving communications devices should be configured to receive the signals representing the data in one of the resource pools, and to transmit the signals representing the data in shared channel resources of the one resource pool indicated in a control channel of the one resource pool. The initiation of the transmission of the SWUS may be for example the communications device signalling to the wireless communications network to cause it to transmit the SWUS. The resource pool in which the SWUS is transmitted may be a different one of the resource pools in which the signals representing the data are transmitted or may be the same resource pool.

Embodiments of the present technique, which further relate to methods of operating communications devices and circuitry for communications devices, allow for the reduction of battery power consumption for sidelink/D2D communications. The saving in power consumption is achieved by providing a sidelink wake-up signal (SWUS). Communications devices need only monitor the SWUS in a resource pool and if the SWUS signal is not detected, the communications device can enter into a reduced power state or remain in a reduced power state.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
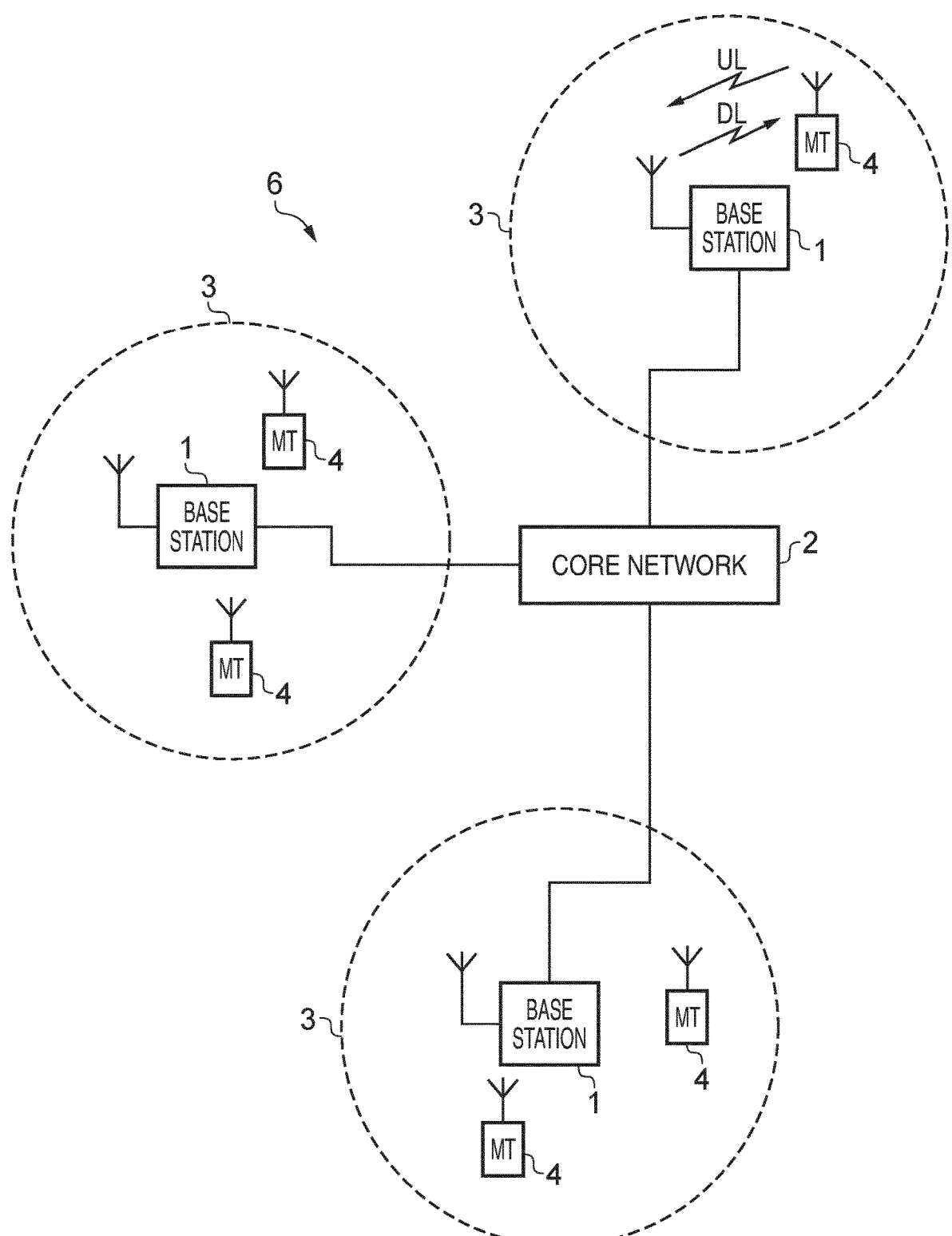
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [1]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from terminal devices 4. Data is transmitted from base stations 1 to terminal devices 4 within their respective coverage areas 3 via a radio downlink (DL). Data is transmitted from terminal devices 4 to the base stations 1 via a radio uplink (UL). The core network 2 routes data to and from the terminal devices 4 via the respective base stations 1 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

The elements of the wireless access network shown in FIG. 1 may be equally applied to a 5G new RAT configuration, except that a change in terminology may be applied as mentioned above.

Figure 2:
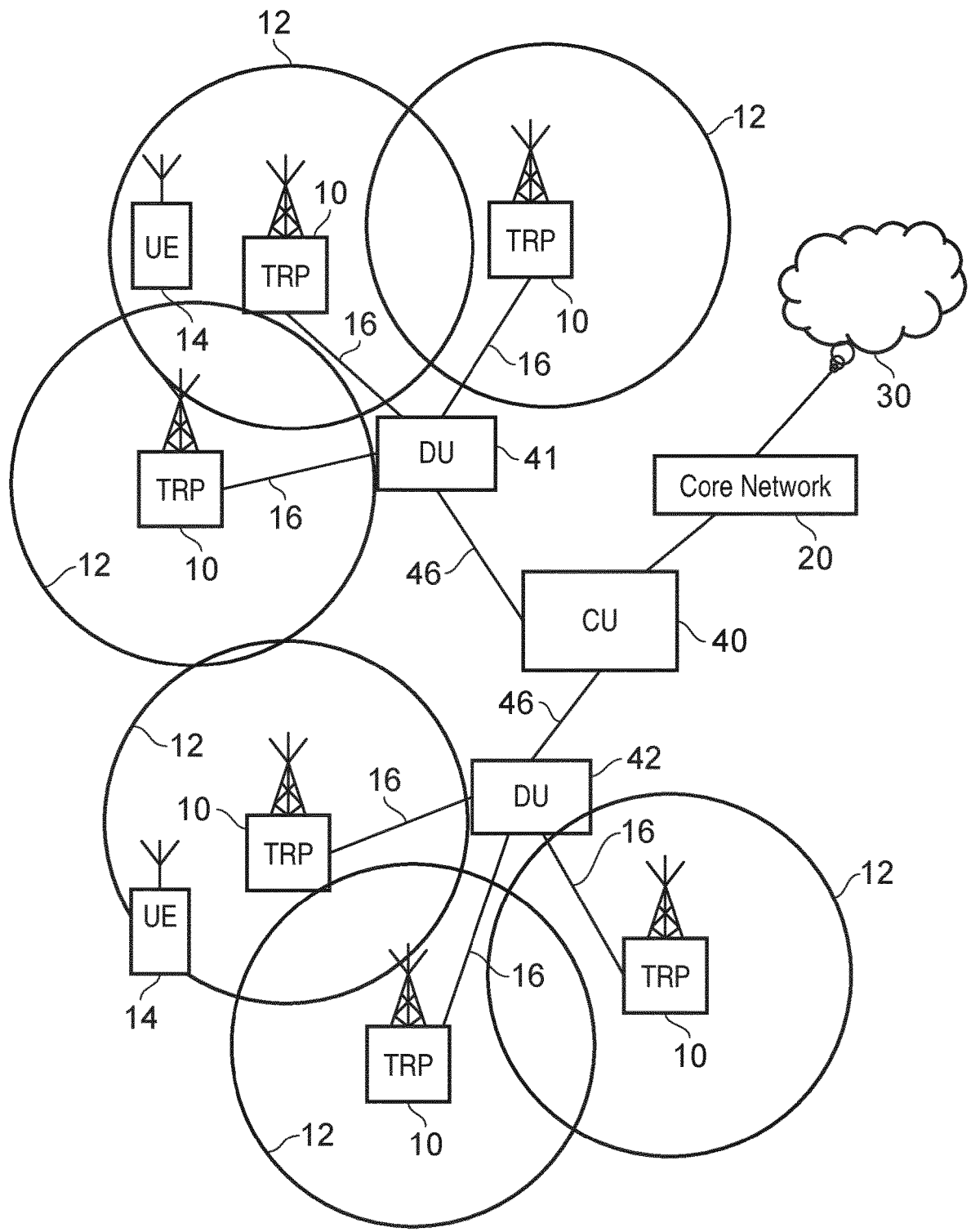
FIG. 2 schematically represents some aspects of a new radio access technology (RAT) wireless telecommunications system which may be configured to operate in accordance with certain embodiments of the present disclosure.

An example configuration of a wireless communications network which uses some of the terminology proposed for and used in NR and 5G is shown in FIG. 2. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus, within a range for performing radio communications via the wireless access interface, each of the TRPs 10, forms a cell of the wireless communications network as represented by a circle 12. As such, wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to the core network 20 which may contain all other functions required to transmit data for communicating to and from the wireless communications devices and the core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly, the communications devices 14 may have a functionality corresponding to the UE devices 4 known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 20 connected to the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/central unit and/or the distributed units/TRPs. A communications device 14 is represented in FIG. 2 within the coverage area of the first communication cell 12. This communications device 14 may thus exchange signalling with the first central unit 40 in the first communication cell 12 via one of the distributed units 10 associated with the first communication cell 12.

It will further be appreciated that FIG. 2 represents merely one example of a proposed architecture for a new RAT based telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Figure 3:
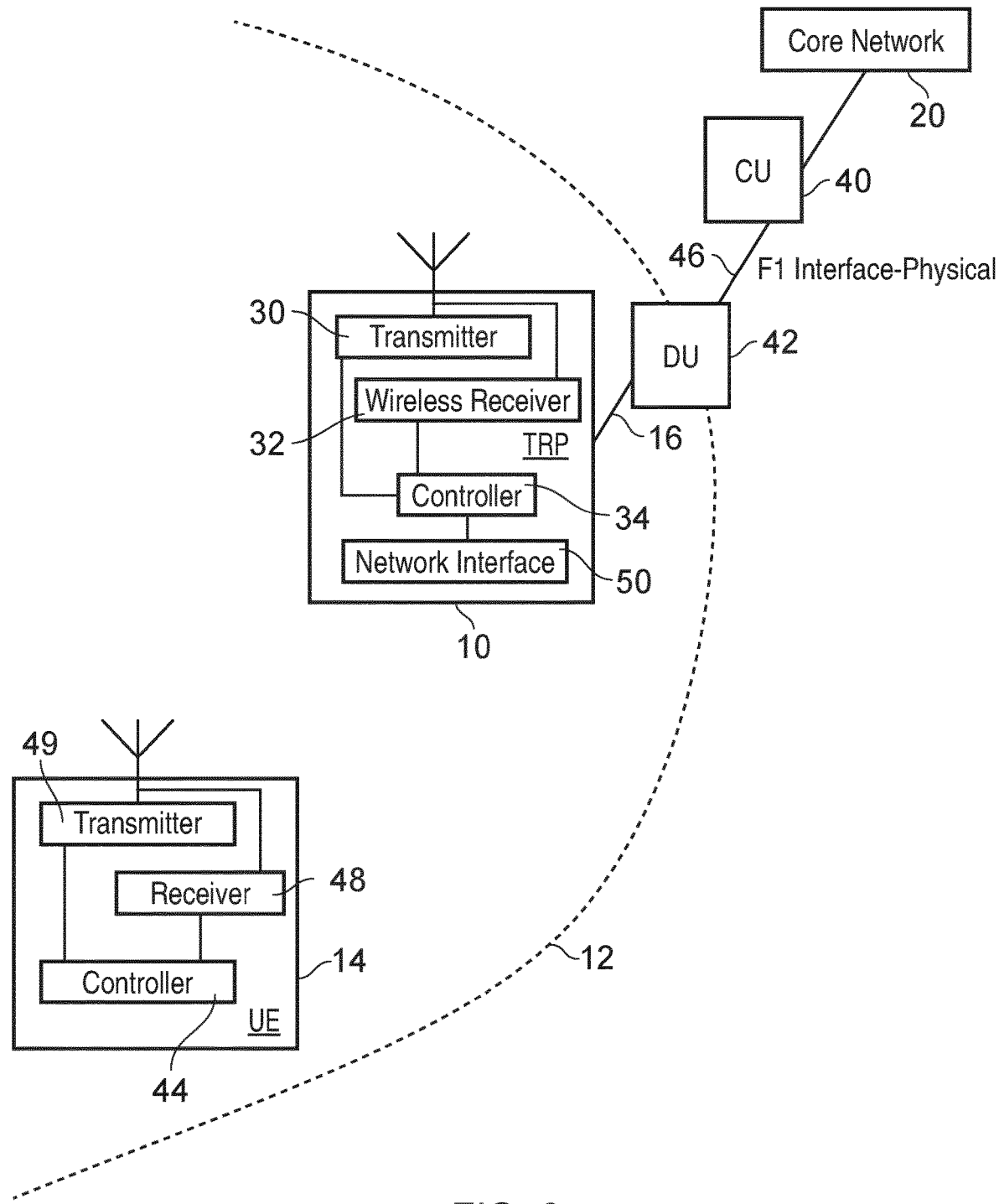
FIG. 3 is a schematic block diagram of an example infrastructure equipment and communications device which may be configured to operate in accordance with certain embodiments of the present disclosure.

A more detailed diagram of some of the components of the network shown in FIG. 2 is provided by FIG. 3. In FIG. 3, a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more UEs 14 within a cell 12 formed by the TRP 10. As shown in FIG. 3, an example UE 14 is shown to include a corresponding transmitter 49, a receiver 48 and a controller 44 which is configured to control the transmitter 49 and the receiver 48 to transmit signals representing uplink data to the wireless communications network via the wireless access interface formed by the TRP 10 and to receive downlink data as signals transmitted by the transmitter 30 and received by the receiver 48 in accordance with the conventional operation.

The transmitters 30, 49 and the receivers 32, 48 (as well as other transmitters, receivers and transceivers described in relation to examples and embodiments of the present disclosure) may include radio frequency filters and amplifiers as well as signal processing components and devices in order to transmit and receive radio signals in accordance for example with the 5G/NR standard. The controllers 34, 44, 48 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium. The transmitters, the receivers and the controllers are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment/TRP/base station as well as the UE/communications device will in general comprise various other elements associated with its operating functionality.

As shown in FIG. 3, the TRP 10 also includes a network interface 50 which connects to the DU 42 via a physical interface 16. The network interface 50 therefore provides a communication link for data and signalling traffic from the TRP 10 via the DU 42 and the CU 40 to the core network 20.

The interface 46 between the DU 42 and the CU 40 is known as the F1 interface which can be a physical or a logical interface. The F1 interface 46 between CU and DU may operate in accordance with specifications 3GPP TS 38.470 and 3GPP TS 38.473, and may be formed from a fibre optic or other wired high bandwidth connection. In one example the connection 16 from the TRP 10 to the DU 42 is via fibre optic. The connection between a TRP 10 and the core network 20 can be generally referred to as a backhaul, which comprises the interface 16 from the network interface 50 of the TRP 10 to the DU 42 and the F1 interface 46 from the DU 42 to the CU 40.

Power Saving and Discontinuous Reception (DRX) in NR

In a typical currently deployed network, idle mode terminal devices are configured to monitor for paging messages periodically. For terminal devices (in connected and idle mode) operating in a discontinuous reception (DRX) mode this occurs when they wake up for their DRX wake time. Paging signals for a specific terminal device are transmitted in defined frames (Paging Frames)/sub-frames (Paging Occasions) which for a given terminal device may be derived from the International Mobile Subscriber Identifier (IMSI) of the terminal device, as well as paging related DRX parameters established in system information transmitted within the network. In connected mode, the terminal device is configured to periodically monitor PDCCH in groups of slots or subframes. If a PDCCH is not detected during the group of slots or subframes, the terminal device may sleep for the next cycle of the periodicity. Power saving is an important aspect of a user's experience of NR, which will influence the adoption of 5G handsets and/or services. DRX is one method of power saving for NR terminal devices.

Figure 4:
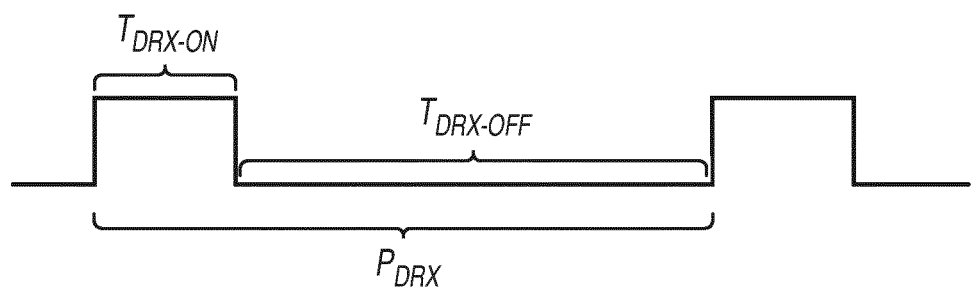
FIG. 4 is a graphical plot of UE processing activity against time illustrating an example of a discontinuous reception (DRX) cycle.

The basic DRX cycle is shown in FIG. 4, which consists of a DRX ON period of duration $T_{DRX-ON}$ and a period of inactivity, i.e. a DRX OFF period of duration $T_{DRX-OFF}$ where the DRX ON period occurs periodically at a DRX period, $P_{DRX}$. During the DRX ON period, the UE switches on its receiver to monitor for downlink traffic and switches off its receiver during the DRX OFF period to save power consumption. The DRX parameters $T_{DRX-ON}$ & $P_{DRX}$ are configured by the network. It should be appreciated by those skilled in the art that such a basic operation may not always be efficient, particularly if a UE frequently does not receive any signals during the ON period (or active operating mode) of the DRX operation.

Wake-Up Signals to Save Power

There are a number of different ways in which the battery life of a UE may be improved. One such way is by enabling a DRX configuration to adapt to a UE's expected data reception or transmission profile. For example, a Wake Up Signal (WUS) may be used to indicate whether a UE should wake up during a DRX ON period. The WUS is a signal or a channel that is transmitted to a UE or a group of UEs prior to a DRX ON period or Paging Occasion to indicate whether the UE(s) needs to wake up during this ON period and monitor for possible traffic, e.g. monitor the PDCCH. Using a WUS signal in this way to wake-up a UE recognises that not every DRX ON period contains traffic for the UE, and for such a case, the PDCCH monitoring consumes unnecessary power from the UE, which can be avoided with this WUS signaling.

Wake-up signals are supported in technologies such as eMTC, NB-IoT and in 5G NR. The eMTC/NB-IoT wake-up signal (WUS) is used in IDLE mode before a paging occasion. If the UE detects a WUS, it wakes up and monitors the following paging occasion for an MPDCCH/NPDCCH that may further allocate a paging message. If the UE does not receive a WUS, it can go back to sleep. The WUS consists of a known sequence. The UE can monitor for the WUS by performing a correlation against this known sequence. As indicated above, the WUS can either be common to all the UEs associated with the paging occasion or associated with a group of UEs that are associated with the paging occasion. An example of a WUS is illustrated by a timing diagram showing a plot of transmission power and UE receiver activity with respect to time 500 provided in FIG. 5.

Figure 5:
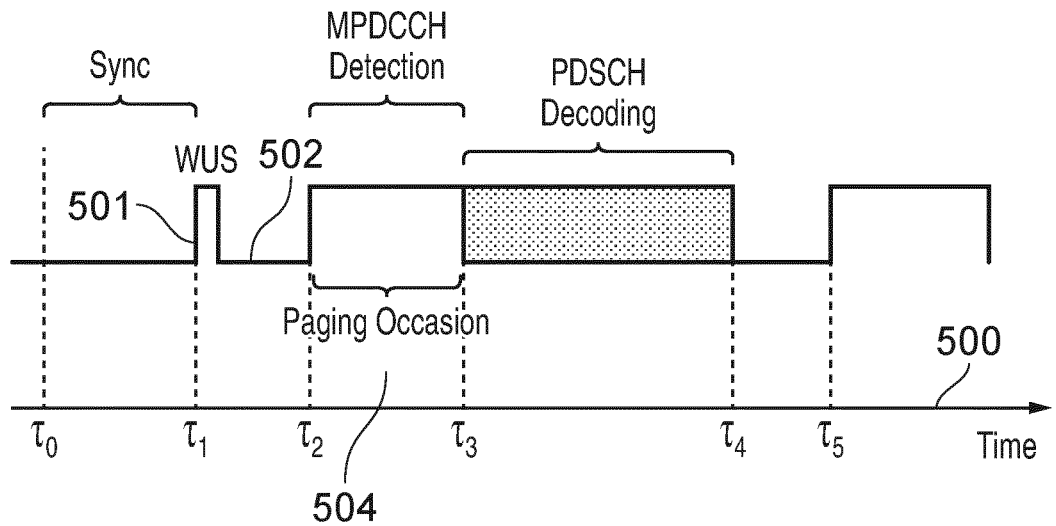
FIG. 5 is a graphical plot of UE processing activity against time illustrating an example of a paging occasion preceded by a wake-up signal according to that used for LTE.

As shown in FIG. 5, a wake-up signal WUS 501 occurs at a known time offset τ2-τ1 502 before a paging occasion 504. The time offset 502 allows the UE to "boot-up" its main receiver after WUS reception and before the paging occasion 504. As a result the WUS itself can be monitored with a lower power receiver. The WUS is transmitted prior to the paging occasion 504 as shown in FIG. 5 at time $τ_1$, only when there is an MPDCCH transmission in that paging occasion. Upon detection of a WUS, the UE will proceed to fine tune its frequency and timing tracking loops if required and blind detects for a MPDCCH between time $τ_2$ and $τ_3$ followed by decoding of the PDSCH carrying the paging message between time $τ_3$ and $τ_4$. If the UE fails to detect a WUS, it will go back to sleep and skip detecting for MPDCCH. Hence by using WUS, the UE will consume less energy by avoiding unnecessary monitoring of MPDCCH. It should be appreciated that WUS can also be used in connected mode when DRX is used.

In some examples, the WUS may be a physical channel containing very little information (e.g. UE ID) and so the UE can decode the WUS very quickly compared with blind decoding for MPDCCH. The WUS can also be encoded with a format that enables low power decoding, for example the WUS may be a narrow bandwidth signal that can be decoded with low power using a low sampling rate receiver.

Figure 6:
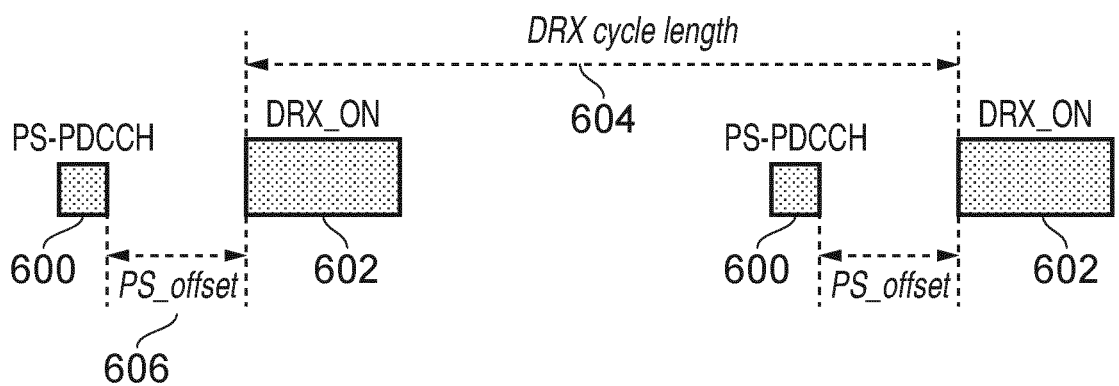
FIG. 6 is a graphical plot of UE processing activity against time illustrating an example of a discontinuous reception (DRX) cycle according to that used for 5G/NR.

For the example of 5G NR, a wake-up signal WUS is used in CONNECTED mode DRX operation. The 5G NR WUS is based on a PDCCH (Physical Downlink Control Channel) that carries a DCI (Downlink Control Information). The PDCCH is termed a "Power saving-PDCCH", PS-PDCCH. An example timing diagram illustrating a transmission of signals with respect to time for a 5G NR operation in a CONNECTED mode is shown in FIG. 6. As shown in FIG. 6, a PS-PDCCH 600 occurs in a search space before a DRX_ON phase 602 of a DRX cycle represented by a double headed arrow 604. This example represents one full CONNECTED mode DRX cycle. A temporal location of the PS-PDCCH 600 is in advance of the DRX_ON phase 602 by an amount PS_offset 606. A UE decodes the DCI within the PS-PDCCH. Since the UE only has to decode the PS-PDCCH, it does not have to operate its full receiver circuitry, hence PS-PDCCH can be decoded with a lower receive power. If the DCI indicates that the UE should wake up, the UE wakes up its full receiver circuitry for the next DRX_ON duration. Otherwise the UE can go to sleep following the PS-PDCCH and does not have to decode other PDCCH during the DRX_ON duration.

It has been proposed that the DCI carried by the PS-PDCCH can instruct the UE to perform other functions within the DRX_ON phase, such as to send a CSI report (channel state information report), send SRS (sounding reference signals), to change DRX parameters etc.

In some examples extra reference symbols may be transmitted either before the PS-PDCCH 600 or after the PS-PDCCH 600:

If before the PS-PDCCH 600, then reference symbols would allow a UE to establish synchronisation with the gNodeB more quickly and hence to wake up from a low power state more quickly;

If after the PS-PDCCH 600 then reference symbols transmitted after the PS-PDCCH 600 and before the DRX_ON period 602 would allow the UE to wake up its main receiver more quickly at the start of the DRX_ON period if the DCI carried by the PS-PDCCH had indicated to the UE that it needed to wake up.

Device-To-Device (D2D) and Sidelink Communications

Device-to-Device (D2D) communications is an aspect of mobile communications which has been established for devices to communicate directly with each other rather than via a wireless communications network. That is to say that radio signals representing data are transmitted via a wireless interface by one device and received by another to communicate that data, rather than the signals being transmitted to radio infrastructure equipment of a wireless communication network, which are then detected and decoded by the infrastructure equipment to recover that data and communicated on to a destination device.

Figure 7:
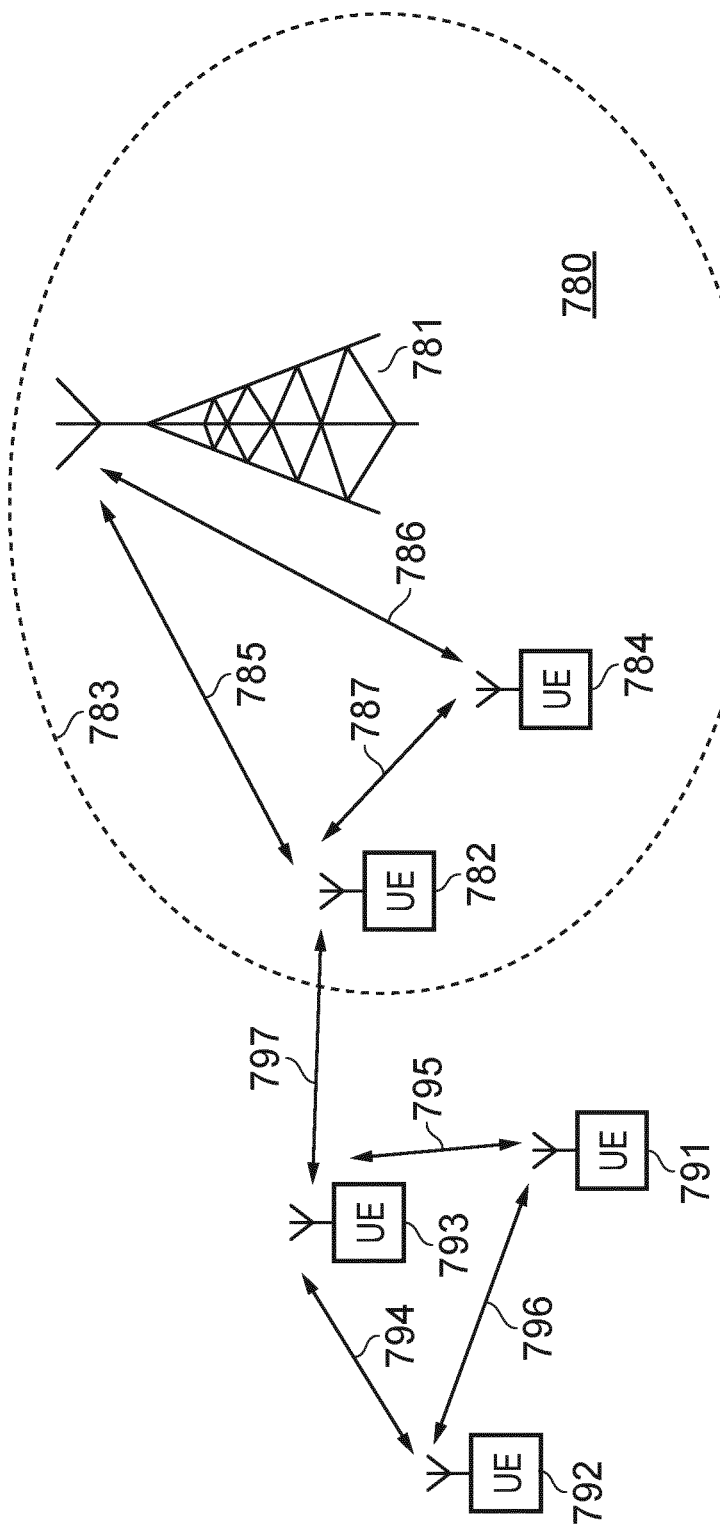
FIG. 7 schematically represents examples of communications device communicating with each other in accordance with different examples of device-to-device (D2D) communications.

D2D communications can take different forms, which are illustrated in FIG. 7. As shown in FIG. 7, in one example two communications devices (UEs) 782, 784 are operating within a coverage area of a cell 780 provided by radio infrastructure equipment 781, which has a cell boundary 783 represented by a dashed line. The radio infrastructure equipment 781 may for example be a TRP 10 such as that shown in FIG. 2. As represented by dashed lines 785, 786, the UEs 782, 784, may transmit and receive signals to the infrastructure equipment 781 to transmit or to receive data on an uplink or a downlink respectively of a wireless access interface formed by a wireless communications network of which the infrastructure equipment 781 forms part. However within the radio coverage area of the cell 780 the UEs 782, 784 may communicate directly between one another via a D2D wireless access interface as represented by a dashed line 787. The UEs 782, 784 can be configured to transmit and to receive signals via a D2D wireless access interface which may be separate and not shared or overlap a frequency band of the wireless access interface provided by the infrastructure equipment 781. Alternatively the UEs 782, 784 may transmit and receive signals via a part of the wireless access interface provided by the infrastructure equipment 781. A D2D wireless access interface formed for one UE to transmit radio signals to another UE is referred to as a sidelink.

Another example of D2D communications is also shown in FIG. 7 where UEs fall outside a coverage area of a wireless communication network and so communicate directly with one another. As represented by dashed lines 794, 795, 796, three UEs 791, 792, 793 are operable to transmit and receive signals representing data via sidelinks. These sidelinks 794, 795, 796 may be formed by a D2D wireless access interface which falls within a frequency band of the infrastructure equipment 781 or may be outside this frequency band. However the UEs 791, 792, 93 organise access to a D2D wireless access interface autonomously without reference to a wireless access interface. In some cases, the UEs 791, 792, 793 may be pre-configured with some parameters for a D2D wireless access interface. As another example, one of the UEs 782 within the coverage area of the cell 780 acts as a relay node for one or more of the UEs 791, 792, 793 which are outside the coverage area as represented by a side link 797.

Here D2D communications of the form of side link 787 are referred to as in-coverage communications, D2D communications of the form of side link 797 are referred to as partial coverage communications, and D2D communications of the form of side links 794, 795, 796 are referred to as out-of-coverage communications.

According to 3GPP standards such as LTE, whilst downlink and uplink communications are specified for transmissions from an infrastructure equipment such as a gNB to a UE and from a UE to a gNB respectively, sidelink communications are specified to realise UE-to-UE (device-to-device (D2D)) communication, especially for sidelink discovery, sidelink communication and vehicle to everything (V2X) sidelink communication between UEs. The LTE sidelink has the following characteristics as described below, which are reproduced from [5]:

Sidelink comprises sidelink discovery, sidelink communication, and V2X sidelink communication between UEs;

Sidelink uses uplink resources and a physical channel structure similar to uplink transmissions. However, some changes, noted below, are made to the physical channels;

The sidelink/D2D wireless access interface structure includes a physical sidelink control channel (PSCCH) for UEs to transmit control signalling to other UEs and a physical sidelink shared channel (PSSCH) for transmitting data to other UEs. Control messages transmitted on the PSCCH can indicate communications resources of the PSSCH via which the UE will transmit data to another UE. The control message for sidelink is referred to as sidelink control information (SCI). Therefore the PSCCH is mapped to the sidelink control resources and indicates resource and other transmission parameters used by a UE for PSSCH;

Sidelink transmission uses the same basic transmission scheme as the uplink transmission scheme. However, sidelink is limited to single cluster transmissions for all the sidelink physical channels. Furthermore, sidelink uses a one symbol gap at the end of each sidelink sub-frame. For V2X sidelink communication, PSCCH and PSSCH are transmitted in the same subframe;

The sidelink physical layer processing of transport channels differs from uplink transmission in the following steps:

Scrambling: for PSDCH and PSCCH, the scrambling is not UE-specific; and

Modulation: 256 QAM is not supported for sidelink. 64 QAM is only supported for V2X sidelink communication;

For PSDCH (physical sidelink discovery channel), PSCCH and PSSCH demodulation, reference signals similar to uplink demodulation reference signals are transmitted in the fourth symbol of the slot in normal cyclic prefix (CP) and in the third symbol of the slot in extended cyclic prefix. The sidelink demodulation reference signals sequence length equals the size (number of sub-carriers) of the assigned resource. For V2X sidelink communication, reference signals are transmitted in the third and sixth symbols of the first slot and the second and fifth symbols of the second slot in normal CP;

For PSDCH and PSCCH, reference signals are created based on a fixed base sequence, cyclic shift and orthogonal cover code. For V2X sidelink communication, the cyclic shift for PSCCH is randomly selected in each transmission;

For in-coverage operation, the power spectral density of the sidelink transmissions can be influenced by the eNB; and For measurement on the sidelink, the following basic UE measurement quantities are supported:

Sidelink reference signal received power (S-RSRP);

Sidelink discovery reference signal received power (SD-RSRP);

PSSCH reference signal received power (PSSCH-RSRP); and

Sidelink reference signal strength indicator (S-RSSI).

Currently, for 5G or New Radio (NR) standardisation, a sidelink has been specified in Release-16 for V2X communication, with the LTE sidelink being a starting point for the NR sidelink. For NR sidelink, the following sidelink physical channels are defined:

Physical Sidelink Shared Channel (PSSCH);
Physical Sidelink Broadcast Channel (PSBCH);
Physical Sidelink Control Channel (PSCCH); and
Physical Sidelink Feedback Channel (PSFCH).

Furthermore, the following sidelink physical signals are defined:

Demodulation reference signals (DM-RS);
Channel-state information reference signal (CSI-RS);
Phase-tracking reference signals (PT-RS);
Sidelink primary synchronization signal (S-PSS); and
Sidelink secondary synchronization signal (S-SSS).

NR sidelink can be enhanced with a power saving mechanism for sidelink which would be a useful feature especially for D2D (device-to-device) communications between devices having limited battery power.

When communicating via a sidelink for D2D communications, a UE may be provided with a bandwidth part (BWP) for transmitting sidelink signals (SL BWP) and a resource pool. The UE is typically configured with the BWP and the resource pool using radio resource control (RRC) signalling. This is typically done by a base station or gNB if the UE is in coverage or reachable by a relay node, but for some examples, where it is known that a UE will be or is likely to be out of coverage of a base station, the SL BWP and resource pool may be preconfigured (hardcoded) onto the UE's SIM (Subscriber Identity Module) card, for example. The resource pool is configured within the SL BWP, and within the resource pool, the UE is provided with a number of sub-channels, where each sub-channel includes a number of contiguous resource blocks (RBs). Each sub-channel is defined as a minimum granularity in the frequency domain for transmission and reception of a PSCCH as a number of PRBs. As part of the configuration of the UE (via RRC signalling or preconfigured for example) the first PRB of the first sub-channel in the SL BWP is indicated. Hence the UE only needs to monitor those sub-channels that have been indicated, reducing a search space and a number of blind decodes necessary at the UE. A slot is the time-domain granularity for a resource pool. Available slots for a resource pool are provided for example by RRC signalling and occur with a certain periodicity. For each period, the RRC signalling may be bitmap signalling or provided as an indication of starting slot and length. A UE may be configured with an Rx (reception) resource pool and a Tx (transmission) resource pool separately. The Rx resource pool may be used for PSCCH monitoring at a Rx UE. Here, those skilled in the art will appreciate that a BWP, which is well known in the art as a power saving scheme for a UE, is a part of a carrier bandwidth providing a number of contiguous resource blocks (RBs) which can be grouped to form a BWP in NR. Multiple BWPs can exist within a carrier bandwidth, but in some examples only one BWP is activated per UE at a given time.

Figure 8:
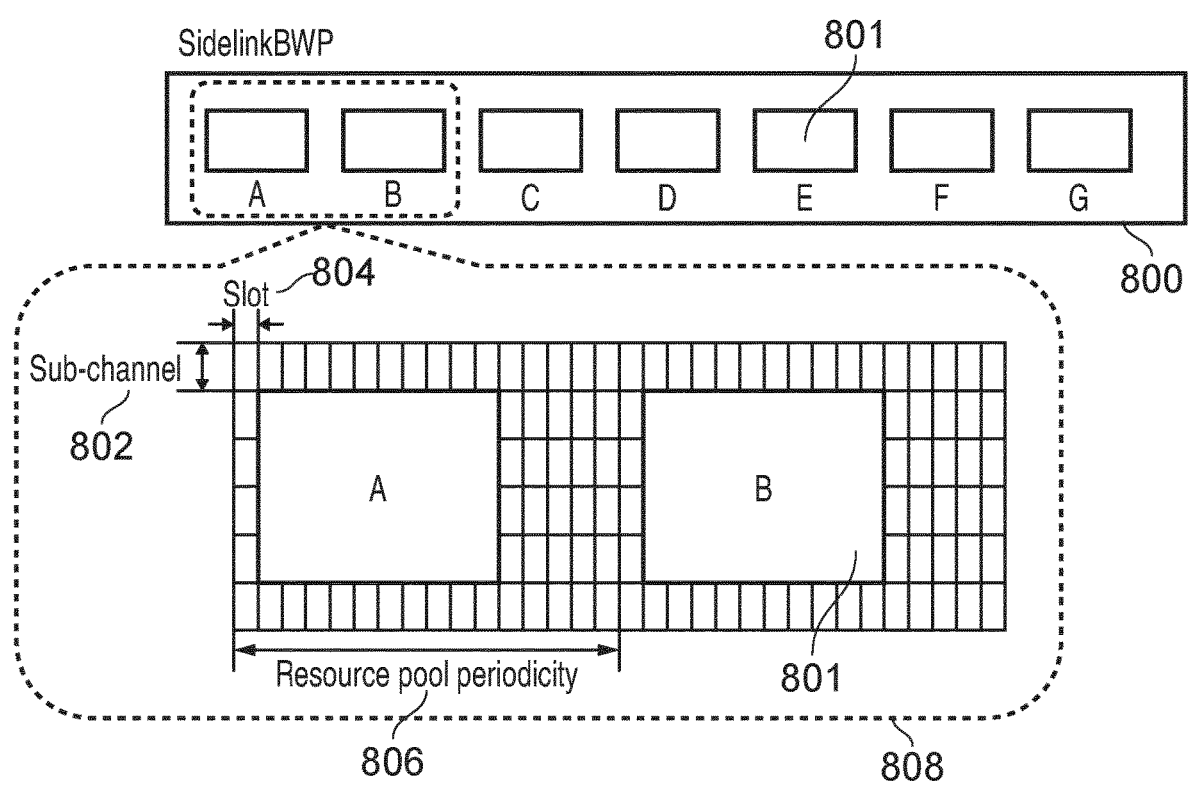
FIG. 8 is a schematic representation of an example of a resource pool configuration for sidelink communications.

FIG. 8 shows an example of resource pool configuration in a sidelink BWP 800. Each instance of the resource pool 801 (labelled A to G) consists of four sub-channels 802 and ten slots 804 starting from the second slot within a resource pool, where the resource pool periodicity 806 is sixteen slots; i.e. the start of each instance of the resource pool 801 is sixteen slots from the start of the previous resource pool instance. Sidelink BWP portion 808 is a zoomed in portion of overall sidelink BWP 800, showing more clearly how two resource pool instances 801 (A and B) are made up from four sub-channels 802 and ten slots 804, with the periodicity 806 of sixteen slots being clearly seen. It should be noted that each instance of the resource pool within the periodicity may consist of non-contiguous slots in the time domain.

Cast Types

In some examples, a sidelink can support broadcasting information to UE as a broadcast channel, groupcast to a group of UEs and unicast to a single UE. That is to say that three "cast types" are supported. For SL broadcast, a UE transmits data to unspecified UEs which are close to the transmitter UE. The SL broadcast may be suitable for alert indication. For SL unicast, a UE transmits data to a specified UE. To realise the unicast transmission, SCI (sidelink control information) includes a destination ID (i.e. identifier of a receiver UE) and a source ID (i.e. identifier of a transmitter UE). For SL groupcast, a UE transmits data to one or more specified UEs within the same group. The SL groupcast may be suitable for a platooning application which is a method for driving a group of vehicles together. To realise the groupcast transmission, SCI includes a destination group ID (i.e. identifier of a group to be received) and a source ID.

Resource Pool Configuration

Figure 9:
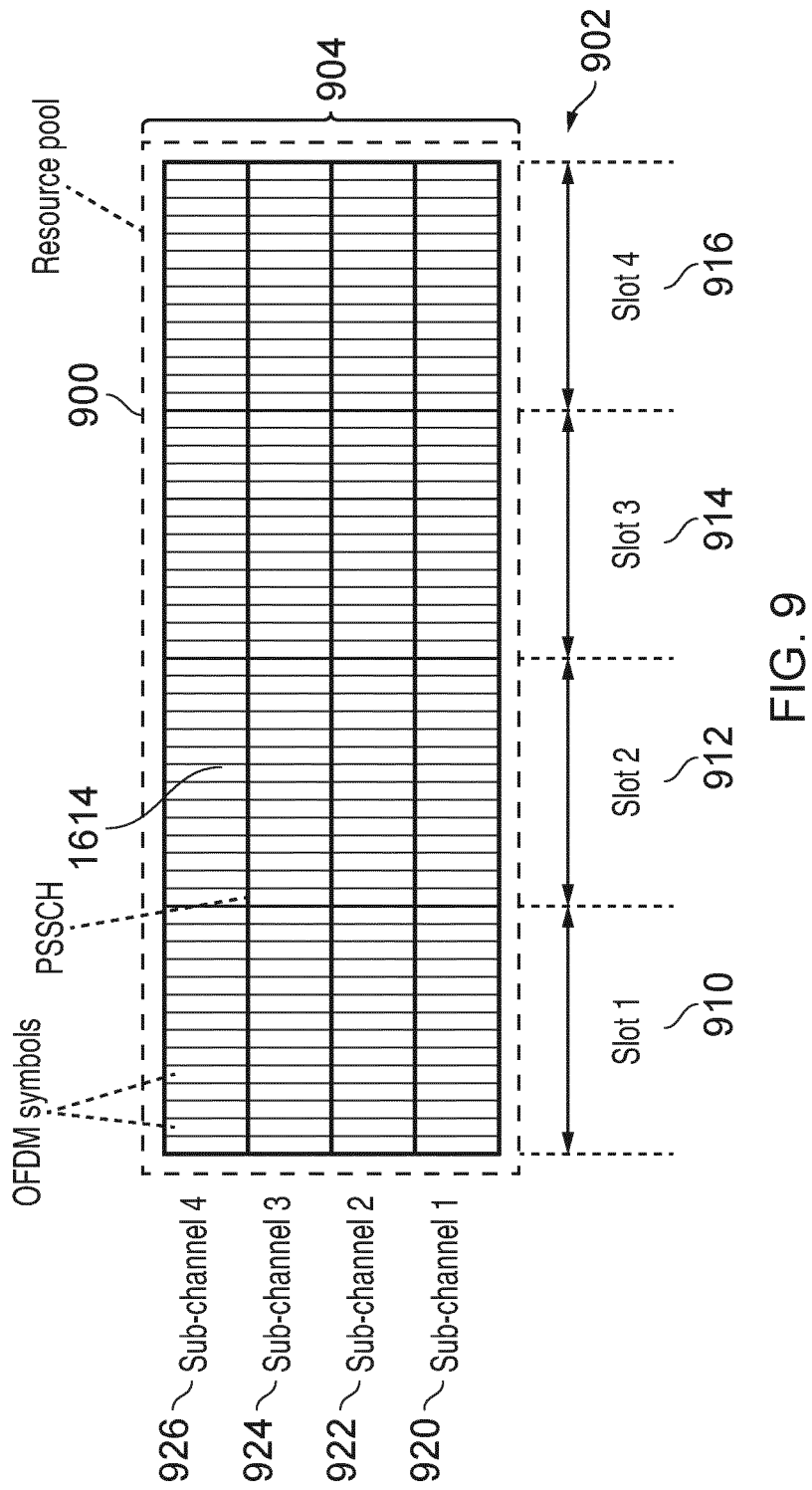
FIG. 9 provides a schematic representation of a resource pool according to the example of FIG. 8 showing physical resources of the resource pool in more detail.

As explained above with reference to FIG. 8, a single resource pool may consist of multiple timeslots and multiple sub-channels. A more detailed example is shown in FIG. 9. In FIG. 9, a resource pool 900 is shown to consist of four slots 902 and four sub-channels 904. Each slot 910, 912, 914, 916 is subdivided into fourteen OFDM symbols 920. As explained above, each of the sub-channels 920, 922, 924, 926 comprises a certain number of physical resource blocks (number of OFDM sub-carriers) used for sidelink communication. The certain number of PRBs in each sub-channel can be pre-configured or configured by RRC signalling.

In existing technology, a UE may need to monitor all of the resources in the sidelink resource pool. Hence for the resource pool shown in FIG. 9, the UE would have to monitor four slots over a frequency range of four sub-channels each time that the resource pool was active.

Figure 10:
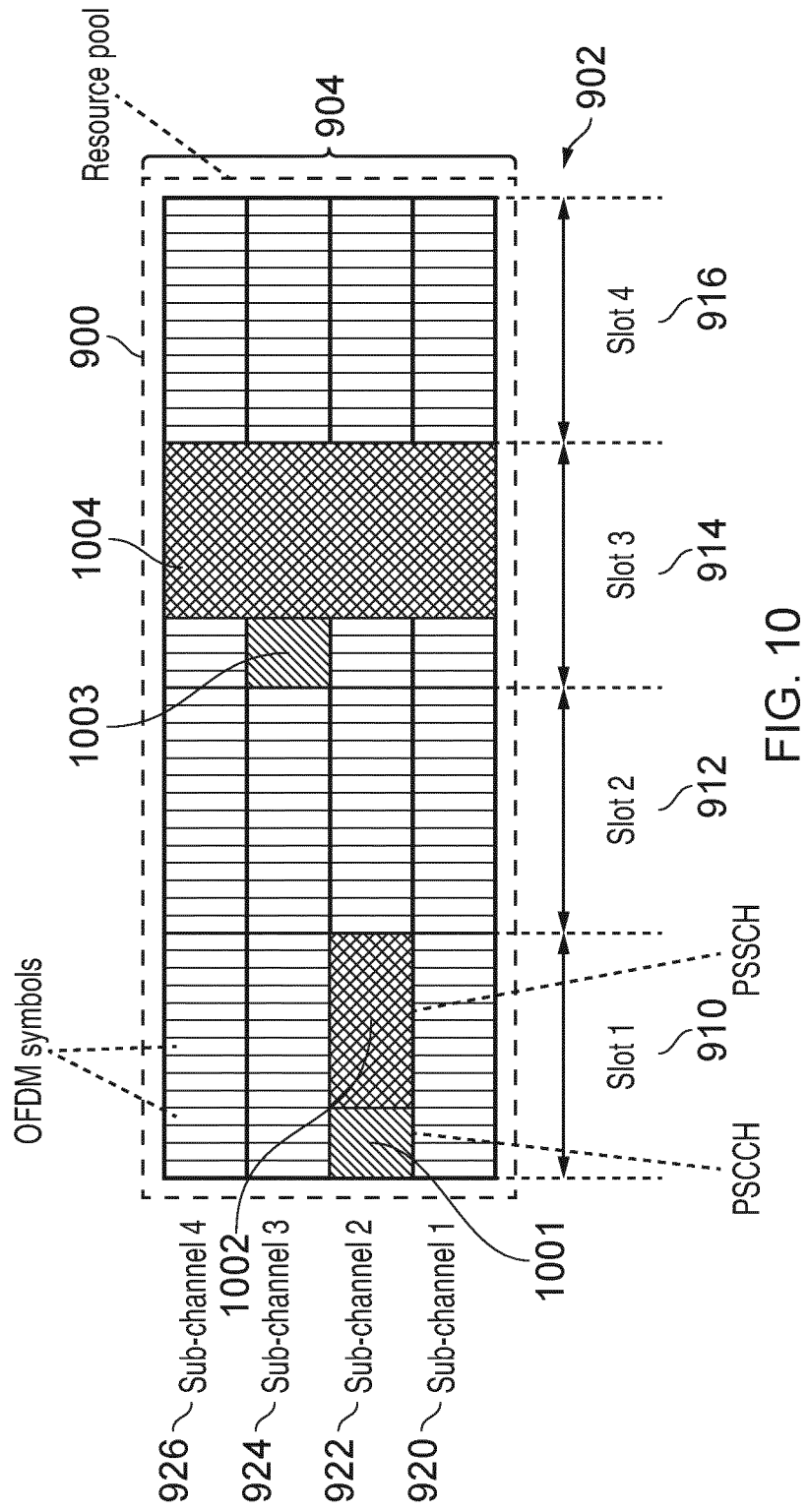
FIG. 10 provides a schematic representation of the resource pool shown in FIG. 9 configured with two examples of communications devices transmitting data by transmitting an indication of resources of a shared channel, the indication being transmitted via a control channel.

Within a resource pool, a UE could be assigned resource via a combination of PSCCH and PSSCH. The UE could be allocated with PSCCH/PSSCH in any of the slots in the resource pool. An example is shown in FIG. 10, in which the resource pool 900 shown in FIG. 9 provides a UE with two sidelink resource allocations. As shown in FIG. 10, which corresponds to FIG. 9 and so bears the same reference numerals, the UE receives an allocation of sidelink resources of a shared channel (PSSCH) 1002 from a first PSCCH 1001. The control signals in the form of sidelink control information (SCI) are received in the PSCCH, which therefore point to the resources of the shared channel PSSCH 1002 allocated to the UE for transmitting or receiving signals to other UEs. Correspondingly, the UE receives in a second instance of the sidelink control channel PSCCH 1003 a second allocation of resources of the shared channel PSSCH 1004. As shown in FIG. 10, the first instance of the PSCCH 1001 occurs in sub-channel 2 in the first four OFDM symbols of slot 1, whereas the second instance of the PSCCH 1003 occurs in sub-channel 3 and the first four OFDM symbols of slot 3.

As will be appreciated from the example shown in FIG. 10, the UE must monitor the whole resource pool in case it is allocated resources within the resource pool. Monitoring every slot and every sub-channel in the resource pool consumes power. As will be appreciated therefore, in sidelink communications, a technical problem can reside in a requirement for a UE to decode a PSCCH in every resource pool that it is configured to monitor. Decoding PSCCH in resource pools consumes energy. It is desirable for some power-constrained devices to conserve power. Hence it is desirable to have a mechanism whereby the UE can skip monitoring those resource pools that are not active.

Embodiments of the present technique can therefore provide an arrangement in which a UE that intends to transmit in a resource pool sends a signal at the start of a resource pool. This signal can be referred to as a "sidelink wake up signal" or SWUS. Receiving UEs that are monitoring the resource pool need to monitor this signal at the start of the resource pool. If the signal is present, the receiver UE should monitor the rest of the resource pool. If the signal is absent, the UE may go to sleep for the rest of the resource pool.

In some embodiments, a presence or absence of an explicit indication or signal within the SWUS indicates respectively explicitly whether the UE should wake up or whether it can go to sleep. The explicit indication could take the form of a bit within a bit string that is transmitted within the SWUS. An embodiment in which explicit indication is always transmitted would require that potential transmitter UEs transmit the SWUS regardless of whether they wish to transmit PSCCH/PSSCH traffic or not. Hence an explicit indication can be wasteful of transmitter UE power resources and of physical resources within the resource pool, in particular in the case that every transmitter UE needs to send its own explicit SWUS signal.

SWUS at the Start of the Resource Pool

Figure 11:
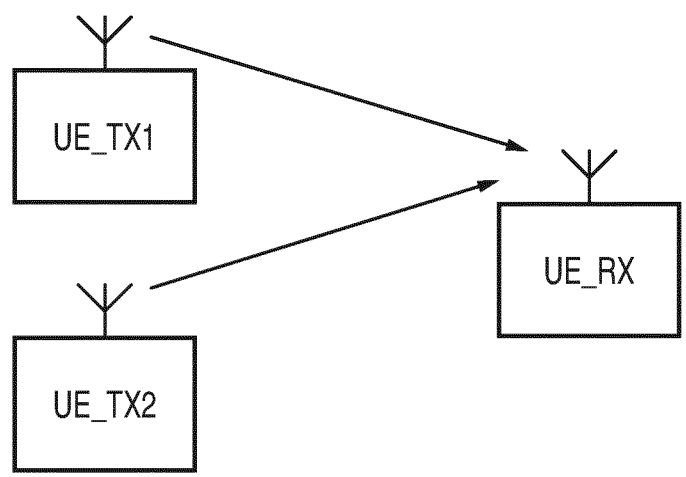
FIG. 11 is a schematic block diagram providing an example of two communications devices transmitting to a receiving communications device according to D2D communications.

A first example embodiment will now be described with reference to FIGS. 11 and 12. FIG. 11 provides a simplified representation of a group of three UEs communicating in accordance with any of the D2D communication scenarios explained above with reference to FIG. 7, so they could be in coverage or out of coverage. FIG. 11 shows a receiver UE, UE_RX, and two transmitter UEs, UE_TX1 and UE_TX2. The receiver UE saves power by monitoring an SWUS and only waking up if the SWUS indicates the resource pool to be active, according to various embodiments described below, and the transmitter UEs, UE_TX1 and/or UE_TX2, communicate with the receiver UE, UE_RX, either by initially transmitting an SWUS to the receiver UE, UE_RX, or after another node transmits an SWUS to the receiver UE, UE_RX. Aspects of example embodiments described below explain how the transmitter UEs, UE_TX1 and UE_TX2, transmit an SWUS to the receiver UE, UE_RX, and how the receiver UE, UE_RX, monitors the SWUS.

Figure 12:
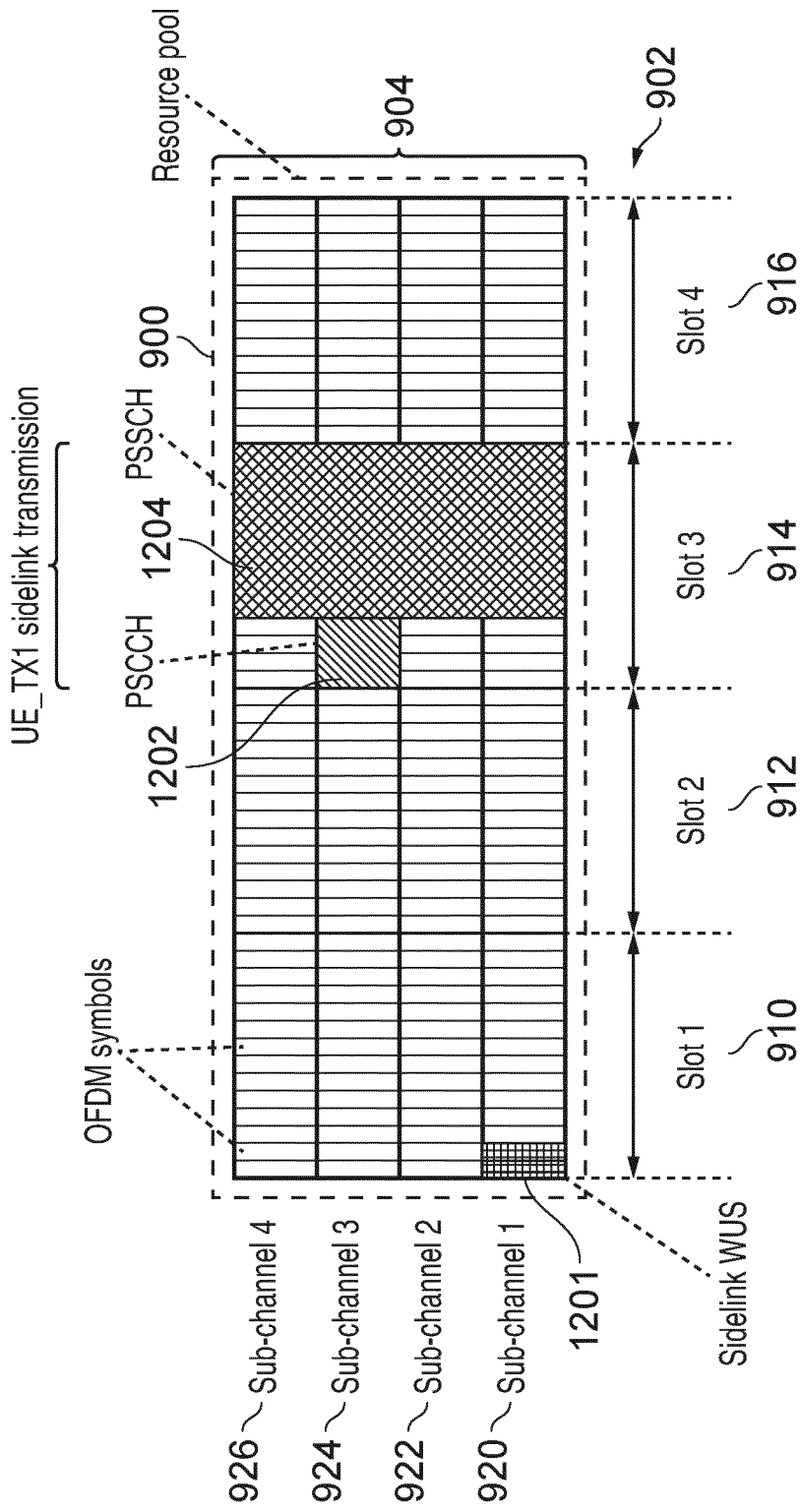
FIG. 12 provides a schematic representation of the resource pool shown in FIG. 9 configured with a sidelink wake-up signal (SWUS) occasion and illustrating an example of a communications device transmitting data by transmitting an SWUS in the SWUS occasion followed by an indication of resources of a shared channel according to an example embodiment of the present disclosure.

FIG. 12 which provides an illustration of a resource pool presented in FIG. 9 configured according to an example embodiment. FIG. 12 provides a representation of a sidelink resource pool corresponding to that shown in FIG. 9 and so corresponding elements have the same numerical designations. According to the example embodiment illustrated in FIG. 12 a sidelink wake up signal (SWUS) 1201 is transmitted in sub-channel 1 920 at the start of the resource pool in the first two OFDM symbols of time slot 1 910. The transmitter UE, UE_TX1, transmits a PSCCH 1202 in the first four OFDM symbols of slot 3 914 in the sub-channel 3 924 and a PSSCH 1204 indicated by the PSCCH 1202 in sub-channels 1 to 4 920, 922, 924, 926 in the remaining OFDM symbols of slot 3 914 as a sidelink transmission. UE_TX1 transmits this sidelink transmission with the intention that it is received by UE_RX. In addition to sending the PSCCH/PSSCH transmission itself, UE_TX1 also transmits the SWUS signal 1201 at the start of the resource pool.

The receiver UE, UE_RX, monitors the first two OFDM symbols of the first slot 910 of the resource pool for an SWUS. According to this example, the transmission of the SWUS 1201 by the UE_TX1 indicates that the receiver UE, UE_RX, (and any other receiving UEs), which are monitoring this resource pool, should wake up and monitor the remainder of the resource pool 900. Hence UE_RX stays awake and monitors the rest of the resource pool, hence decoding the PSCCH/PSSCH that were transmitted by UE_TX1. If UE_RX had not received the SWUS in these OFDM symbols, it could go to sleep for the remainder of the resource pool (i.e. it could sleep for the remainder of slot 1 910, and slots 2, 3, 4 912, 914, 916).

According to this example embodiment, the SWUS 1201 is located at the start of the resource pool 900 and controls whether receiving UEs, UE_RX, should remain active or not for the whole resource pool 900. A receiver UE, UE_RX, wakes up at the start of the resource pool and attempts to decode the SWUS 1201. If it does not decode the SWUS 1201 or the SWUS 1201 does not indicate that the receiver UE, UE_RX, needs to receive PSCCH/PSSCH within the resource pool, then the UE can go to sleep for the remainder of the resource pool.

SWUS at the Start of Every Slot within a Resource Pool

According to another example embodiment multiple SWUS may be transmitted within a resource pool, with one SWUS occurring at the start of every slot within a resource pool. This example is illustrated by a configuration of a resource pool 900 in FIG. 13, which corresponds to the example resource pool of FIGS. 9, 10 and 12 and so like parts have the same numerical designations. According to this example embodiment a receiver UE, UE_RX, monitors each of the SWUS transmission occasions 1301, 1302, 1303, 1304 in each slot 910, 912, 914, 916 for a transmission of an SWUS by any of the transmitting UEs, UE_TX1, UE_TX2 and if the SWUS indicates that the UE should wake up during that slot within the resource pool 900, then the receiver UE wakes up, otherwise the UE can go to sleep. This example embodiment has the following features:

Slot 1: SWUS indicates that receiver UEs can go to sleep during slot 1.

Slot 2: As for slot 1.

Slot 3: SWUS indicates that receiver UEs should wake up during this slot since there will be some PSCCH 1312/PSSCH 1314 activity within this slot 914. Based on this SWUS indication 1303, receiver UEs wake up and read PSCCH 1312/PSSCH 1314 during the slot.

Slot 4: As for slot 1.

In this example, a PSCCH 1312 does not overlap with the SWUS 1301. As such, the receiving UE, UE_RX, can decode the SWUS 1303 and based on the outcome of that decoding then determine whether to decode the PSCCH 1312 or not. It is also possible that the PSCCH 1312 could overlap (in time) with the SWUS 1303. In this overlapping case, the receiving UE would sample the received signal during the first two OFDM symbols of the slot, which sampling is required in order to decode the SWUS anyway. The UE would then decode the SWUS status 1303 and decide whether the slot 914 was active or not. If the slot 914 is active, the UE would then further sample OFDM symbols during the remaining twelve OFDM symbols of the slot 914. The UE can then decode the PSCCH 1312/PSSCH 1314 based on a combination of the samples from the first two OFDM symbols and the remaining twelve OFDM symbols.

While this embodiment has presented an SWUS that controls a single slot, it will be apparent that an SWUS could refer to multiple slots. For example, referring to FIG. 13, an SWUS in slot 1 could relate to slot 1 and slot 2, whereas an SWUS in slot 3 could relate to slot 3 and slot 4.

Cross-Slot SWUS within Resource Pool

Figure 13:
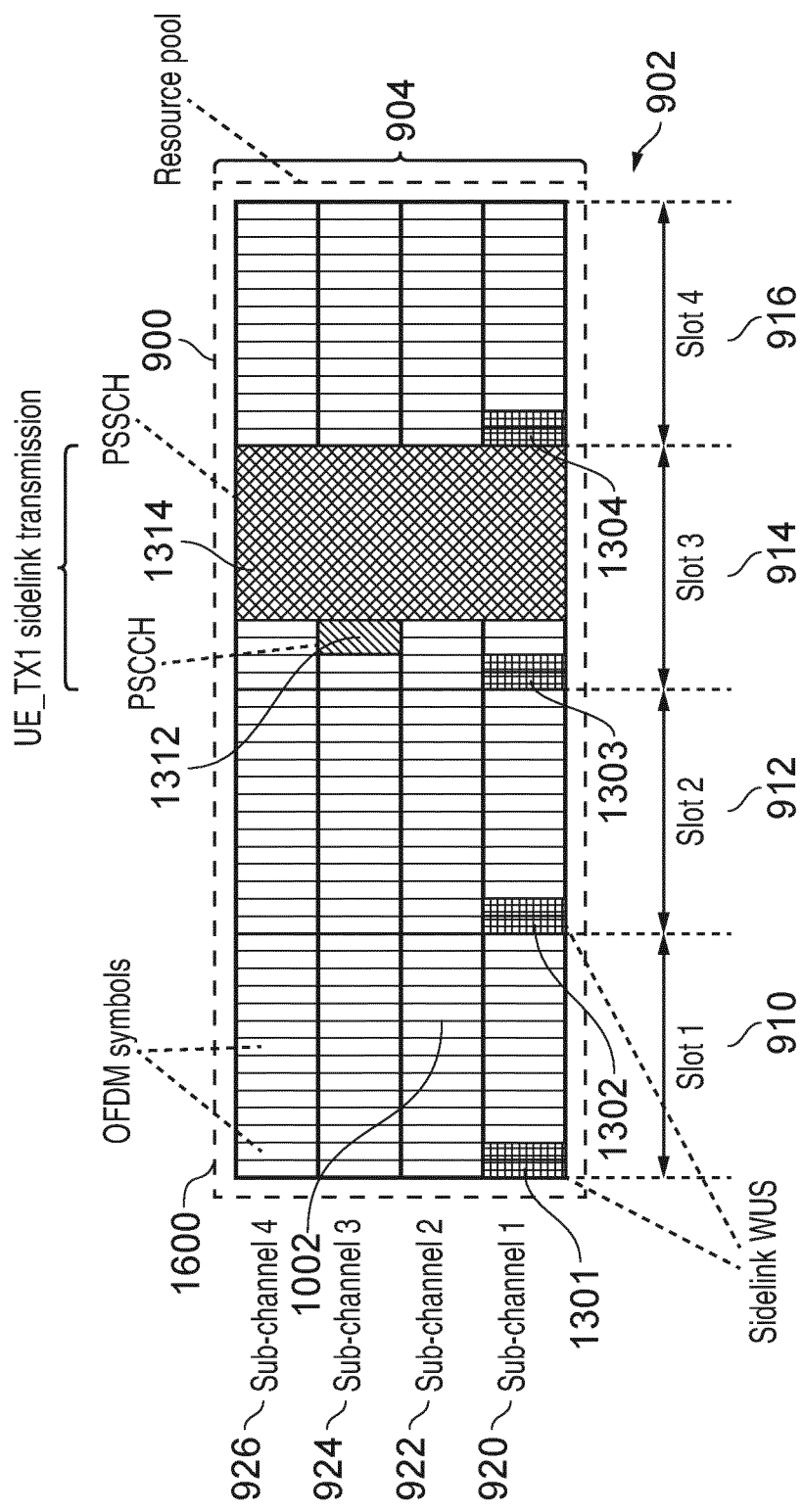
FIG. 13 provides a schematic representation of the resource pool shown in FIG. 9 configured with an SWUS occasion in each of a plurality of time slots and illustrating an example of communications device transmitting data by transmitting an SWUS in one of the SWUS occasions followed by an indication of resources of a shared channel according to another example embodiment of the present disclosure.
Figure 14:
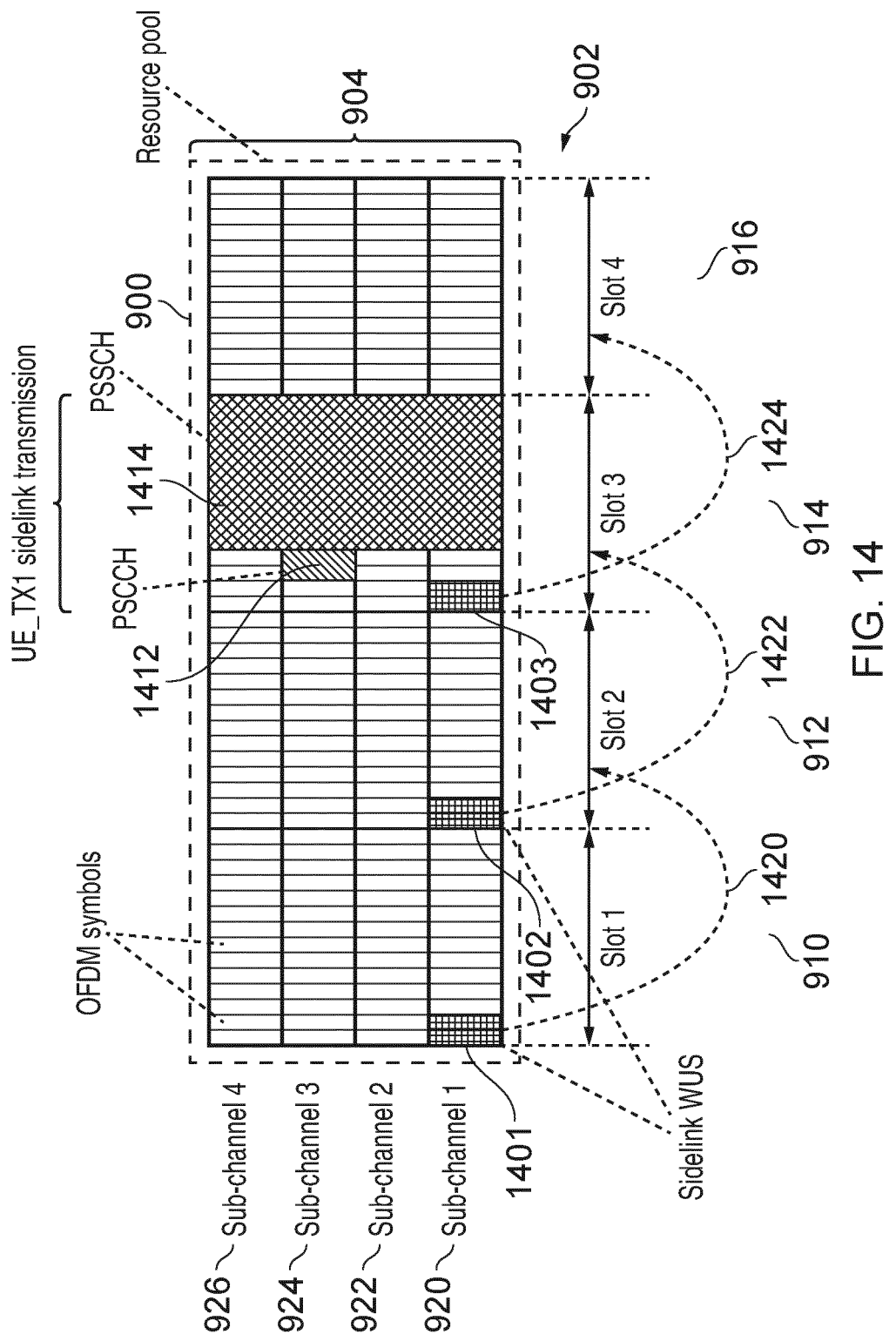
FIG. 14 provides a schematic representation of the resource pool shown in FIG. 9 configured with an SWUS occasion in each of a plurality of time slots and illustrating an example in which an SWUS transmitted in one time slot indicates that an indication of resources of a shared channel will be transmitted in a subsequent time slot according to another example embodiment of the present disclosure.

According to another example embodiment, an SWUS in one slot relates to a PSCCH/a PSSCH activity in a following slot, as shown in FIG. 14. FIG. 14 corresponds to the example of the sidelink resource pool shown in FIG. 13 and so only the differences will be described. In FIG. 14, SWUS transmission occasions 1401, 1402, 1403 provide opportunities for a transmitting UE, UE_TX, to transmit an SWUS which includes an indication that a PSCCH/PSSCH may be transmitted and so the receiving UE, UE_RX should power-up its receiver. In this example, an SWUS transmitted in one time slot indicates that a following time slot will be active in that the PSCCH and PSSCH will be transmitted in the following time slot. As represented by arrows 1420, 1422, 1424, an SWUS transmitted in the first time slot 1 910 indicates that the UE should receive a PSCCH/PSSCH in the following time slot 912 as indicated by the arrow 1420. Likewise, an SWUS 1402 in slot 2 912 indicates a PSCCH/PSSCH in slot 914 as represented by the arrow 1422, and an SWUS 1403 in slot 3 914 indicates a PSCCH/PSSCH in slot 4 916 as represented by the arrow 1424. In this example the SWUS in slot 2 912 indicates (arrow 1422) that a PSCCH 1412 and PSSCH 1414 will be transmitted in slot 3 914.

According to this example a UE_RX is able to sample and buffer only those OFDM symbols of a slot that potentially contain an SWUS. Referring to FIG. 12, if the UE_RX is unable to decode the SWUS within the two OFDM symbols of the SWUS transmission occasion, then the UE_RX would need to speculatively buffer further OFDM symbols until it was able to decode the SWUS. For example, if the UE_RX required four OFDM symbols to decode the SWUS, the UE_RX would need to speculatively sample four OFDM symbols just in case the SWUS indicated that that slot was active. According to this example embodiment therefore an advantage is provided of simplifying receiver implementation because the UE_RX can be configured to sample and buffer only those OFDM symbols of an SWUS occasion in which an SWUS may be transmitted.

The example embodiment illustrated in FIG. 14 is summarised as follows:

Slot 1. An SWUS indicates whether the receiver UE needs to wake up or may sleep during slot 2 of the resource pool. This gives the UE the option of sleeping (reducing power to its receiver, but this is not compulsory). In this example, the SWUS indicates that the UE can go to sleep in slot 2.

It is apparent that there is no SWUS that covers receiver UE wake-up/go-to-sleep operation in slot 1 itself, since the slot 1 SWUS indicates activity status in slot 2. The UE can determine whether to wake up or not in slot 1 by one of the following methods:

The UE always wakes up in slot 1. i.e. slot 1 is not controlled by an SWUS.

The SWUS in slot 1 also controls whether the UE wakes up in slot 1 or not. i.e. the SWUS in slot 1 controls both slot 1 and slot 2. In this case, the UE may need to speculatively sample and buffer some OFDM symbols in slot 1, as per the previous discussion.

Slot 2. An SWUS indicates that the UE needs to wake up in slot 3. The UE only samples the two OFDM symbols of the SWUS occasion within which this SWUS potentially exists: it does not need to sample and buffer the other twelve OFDM symbols of the slot.

Slot 3. The UE wakes up to decode PSCCH/PSSCH, based on the wake-up indication from the SWUS in slot 2.

Slot 3. SWUS indicates that the UE does not need to wake up in slot 4.

Slot 4. There is no SWUS in slot 4 since this is the last slot of the resource pool. The UE wakes up (or not) in slot 4 based on the status of the SWUS in slot 3.

In a related embodiment, an SWUS in one resource pool can indicate whether the following resource pool is active or not. In this case, the SWUS acts in a cross resource pool manner.

SWUS at the Start of Every Resource Pool and an SWUS Covering Every Slot

Figure 15:
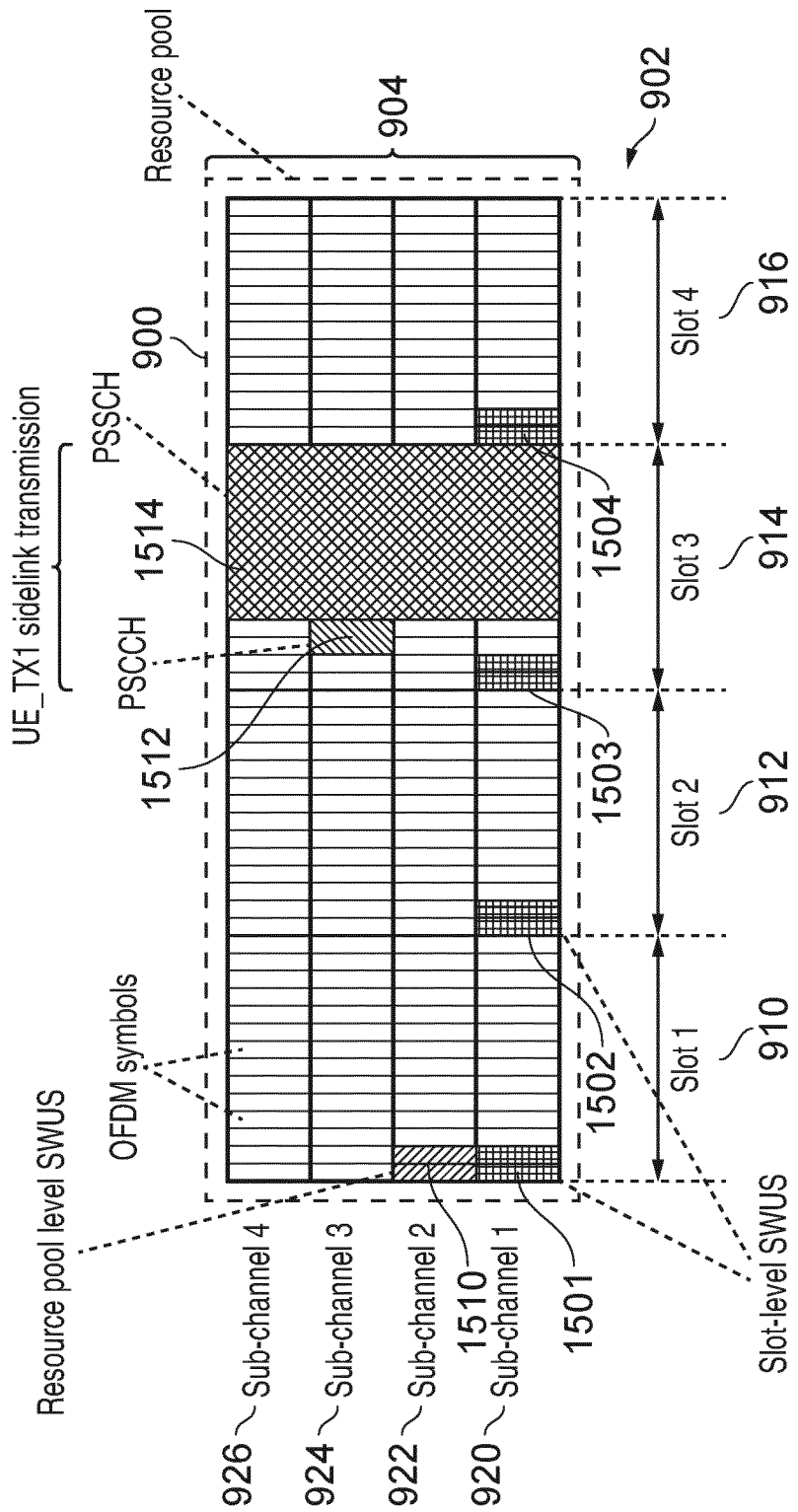
FIG. 15 provides a schematic representation of the resource pool shown in FIG. 9 configured with an SWUS occasion in each of a plurality of time slots and illustrating an example in which an SWUS occasion indicates whether the resource pool is active for transmitting data according to another example embodiment of the present disclosure.

This embodiment is a combination of embodiments described with reference to FIG. 12 and FIG. 13. In this embodiment, an additional SWUS occasion is provided in the first slot of the resource pool, which indicates at a resource pool level whether receiver UEs can sleep for that resource pool or not. This is referred to as a resource pool level SWUS. If this SWUS indicates that the UE should wake up in this resource pool, the UE monitors slot-level SWUS within each slot of the resource pool. If the slot-level SWUS indicates that the slot is active, the UE wakes up during that slot of the resource pool. This example embodiment is illustrated in FIG. 15, which again corresponds to the examples shown in FIGS. 9 and 11 to 14 and so only the differences will be described. As shown in FIG. 15, in the first two OFDM symbols of the first time slot 910 of sub-channel 2 922, a resource pool level SWUS occasion 1510 is provided. This provides an opportunity for a transmitter UE, TX_UE1, TX_UE2 to transmit an SWUS in the SWUS occasion 1510, which indicates whether the receiving UEs can sleep for the entire resource pool or needs to monitor further slot-based SWUS during the resource pool.

Compared to other embodiments mentioned above, the existence of the resource pool level SWUS 1510 allows receiving UEs to further reduce power consumption by not having to monitor for slot-level SWUS within the resource pool 900.

The example embodiment of FIG. 15 is summarised as follows:

Slot 1: Resource pool level SWUS 1510 indicates that it will transmit somewhere within the resource pool. Based on this indication, the receiver UE determines that it needs to monitor the slot-level WUS within every slot.

Note that if the resource pool level SWUS 1510 had indicated that no UE would transmit in the resource pool, the receiver UE could have slept for the remainder of the resource pool shown.

Slot 1: A slot-level SWUS 1501 is also transmitted in slot 1, controlling whether the UE needs to wake up in slot 1. In the example shown, the slot-level SWUS 1501 in slot 1 910 indicates that the UE does not need to wake up in slot 1 910. Hence the UE can go to sleep for the last twelve OFDM symbols of slot 1 910.

In a sub-embodiment, there is no slot-level SWUS 1501 in slot 1 910 of the resource pool 900. The SWUS 1501 in slot 1 910 is interpreted as a resource pool level SWUS and this SWUS indicates jointly whether the UE either (1) needs to wake up for slot 1 and monitor slot-level SWUS in other slots of the resource pool or (2) may go to sleep for the remainder of slot 1 and other slots of the resource pool.

Slot 2. Based on the resource pool level SWUS in slot 1 indicating that the resource pool is active, the UE monitors the slot-level SWUS in slot 2.

Slots 3, 4. Correspond to the example shown in FIG. 12 and so the same operations are performed as explained with reference to FIG. 12.

According to example embodiments, the SWUS may consist of a sequence that is to be transmitted in certain time and frequency resources which are assigned for the SWUS occasion. For example, the SWUS may consist of a PRACH (Physical Random Access Channel) sequence, such as a preamble consisting of a PN (Pseudo-Noise)-sequence, CAZAC (Constant amplitude zero autocorrelation waveform) or Zadoff-chu sequence or a sequence with similar properties to PRACH. In another example, the SWUS may consist of a demodulation reference signal (DMRS) sequence.

From the system perspective, each transmitter UE could be configured with its own UE-specific time/frequency resources of an SWUS occasion for transmitting an SWUS, or different UEs could share the same resources of an SWUS occasion for transmitting SWUS. In one example, transmitter UEs could be UE-specifically assigned SWUS time/frequency resources for an SWUS occasion, but the gNodeB (or other node that assigns SWUS resources) could assign more than one UE with the same time/frequency resources for the SWUS occasion.

In the case that more than one transmitter UE is assigned to use the same SWUS resources:

If more than one transmitter UE uses these resources, the SWUS transmissions from these UEs may collide. Provided the structure of the SWUS signal is suitably designed, a receiver UE should be able to decode the collided signal. For example, if the SWUS consists of a timing advanced OFDM-based signal with a cyclic prefix, provided both of the transmissions are aligned to the level of the cyclic prefix, the receiver UE should be able to decode the collided transmission, which according to the properties of OFDM would appear to the receiver UE to be a single transmission with two multipath components.

If one or more transmitter UEs use a common SWUS, all receiver UEs that monitor that SWUS will wake up/go to sleep on the basis of that SWUS. In this case, the SWUS may provide information for activating the resource pool for all receiver UEs if one or more transmitter UEs is going to transmit. This might be desirable functionality in a case in which (1) the receiver UEs wish to maintain a database/record of which transmitter UEs are active or (2) transmitter UEs wish to groupcast/multicast/broadcast messages to more than one receiver UE.

In some example embodiments an SWUS may be transmitted by a network element such as an infrastructure node such as a gNB. In the example embodiments presented above, the transmitter UEs transmit the SWUS. However in other embodiments, the gNodeB could transmit the SWUS. According to this example, those transmitter UEs that intended to transmit in a resource pool inform the gNodeB of that intention. The gNodeB then transmits an SWUS at the beginning of the resource pool that either activates or deactivates that resource pool. As will be appreciated, this example embodiment applies to a situation in which a group of UEs are operating in coverage. That is to say the UEs are within a radio coverage area of the gNodeB. According to this example, the gNodeB can schedule the resource for D2D sidelink communications by using a PDCCH, which provides a sidelink resource allocation to a UE.

In another example, transmitter UEs may also monitor an SWUS occasion before transmitting in a resource pool. Although the transmitter UEs may have signalled to the gNodeB that they intend to transmit in the resource pool, the gNodeB may over-ride that intention and deactivate the resource pool. An example reason for deactivating the resource pool would be that the gNodeB decides to use the resource pool for scheduling non-sidelink resources within the resource that had been reserved for sidelink use.

SWUS Indicates which UEs are Going to Transmit or which UEs Need to Receive

In some example embodiments an SWUS may indicate which of a group of transmitter UEs are going to transmit in the resource pool. That is to say that in the above examples, the SWUS identifies the UE which will be transmitting a PSCCH/PSSCH. In one example UEs may be differentiated by different transmitter UEs using different physical resources for transmitting the SWUS. In this example different UEs use different SWUS occasions. Alternatively, different transmitter UEs can use different bit fields within a common SWUS occasion.

In other example embodiments, if the gNodeB is to transmit the SWUS, then the gNodeB can transmit information in the SWUS which can include a list of transmitter UEs which may transmit in the resource pool. The UEs may therefore detect the SWUS transmitted by the gNodeB and use the information to identify UEs which may transmit in the resource pool or receive an indication that a UE is given permission to transmit in the resource pool.

In a related embodiment an SWUS transmitted by a gNodeB can contain a list of receiver UEs that need to be active in the resource pool. In this case, only those UEs that are indicated in this list wake up to receive signals from other UEs.

Figure 16:
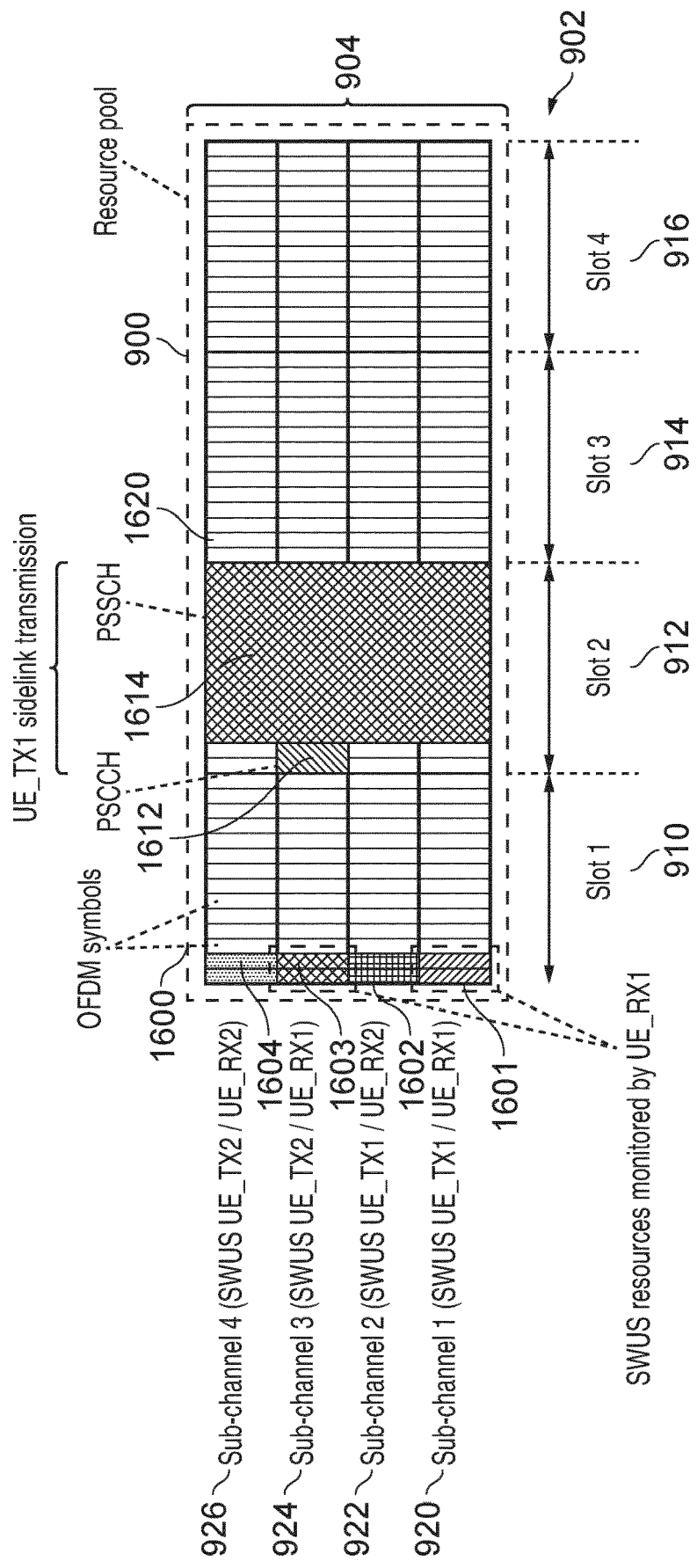
FIG. 16 provides a schematic representation of the resource pool shown in FIG. 9 configured with an SWUS occasion for each of a plurality of transmitting communications device and receiving communications device pairs according to another example embodiment of the present disclosure.

FIG. 16 provides an illustration according to this example embodiment, which again corresponds to the example presented in FIGS. 9 to 15 so only the differences will be explained. In FIG. 16 SWUS physical resources 1601, 1602, 1603, 1604 forming each SWUS occasion are separately assigned to different UEs allowing different transmitter UEs to wake up different receiver UEs. As shown in FIG. 16, an SWUS occasion 1600 comprises four separate physical resources 1601, 1602, 1603, 1604 formed respectively in each of the sub-channels 920, 922, 924, 926 in the first two OFDM symbols of the first slot 910. A first of the physical resources 1601 provides an SWUS for a first transmitter UE_TX1 and a first receiver UE UE_RX1, a second of the physical resources 1602 provides an SWUS for the first transmitter UE_TX1 and a second receiver UE UE_RX2, a third of the physical resources 1603 provides an SWUS for a second transmitter UE_TX2 and the first receiver UE UE_RX1, and a fourth of the physical resources 1604 provides an SWUS for the second transmitter UE_TX2 and the second receiver UE UE_RX2. In this example, only the first transmitter UE UE_TX1 transmits a PSCCH 1612 in sub-channel 3 924 which allocates resources of the PSSCH 1614 in slot 2 912. According to this example:

There are two transmitter UEs and two receiver UEs
Each transmitter UE is associated with an SWUS for each receiver UE
Each receiver UE monitors an SWUS for each transmitter UE
Hence in the case that there are two transmitter UE and two receiver UEs:
Receiver UE, UE_RX1, monitors for SWUS in sub-channels 1 and 3
1: An SWUS active on sub-channel 1 would indicate that transmitter UE, UE_TX1, is going to communicate with it
3: An SWUS active on sub-channel 3 would indicate that transmitter UE, UE_TX2, is going to communicate with it
Transmitter UE, UE_TX1, transmits SWUS in sub-channel 1 if it wants to communicate with UE_RX1 and it transmits SWUS in sub-channel 2 if it wants to communicate with UE_RX2.

In other examples, there does not need to be "full connectivity": a receiver UE could monitor only SWUS that are associated with a subset of the transmitter UEs.

Providing an arrangement in which a receiver UE knows which transmitter UEs are going to communicate with it can provide the following advantages:
The receiver UE can enter a low power state after having received the transmissions from a transmitter UE. For example, if it is known that a transmitter UE will only transmit once per resource pool and that two transmitter UEs are active, once the receiver UE has received transmissions from each of the transmitter UEs, it can go to sleep, thereby saving power.

The receiver UE can prioritise one transmitter UE over another one. For example, if the receiver UE has a limited capability and it is aware that a high priority UE (UE_TX1) and a low priority UE (UE_TX2) are going to transmit to it, it could set its receiver up to only receive the high priority PSCCH/PSSCH from the high priority UE, UE_TX1. In another instance of the resource pool, that same limited capability UE could decode the transmission from the lower priority UE, UE_TX2, if only the SWUS for UE_TX2 had been active in that other instance of the resource pool.

By virtue of the transmitter UE transmitting SWUS on different resources if it wants to communicate with different receiver UEs, the transmitter UE is able to communicate with one receiver UE while not waking up another receiver UE. For example, if UE_TX1 wishes to communicate with UE_RX1, it sends an SWUS on sub-channel 1. Since UE_RX2 does not monitor sub-channel 1, UE_RX2 is not inadvertently woken up by UE_TX1.

FIG. 16 shows the following occurring within a resource pool:
Slot 1:
There are 4 SWUS physical resources 1601, 1602, 1603, 1604 that are defined in four different sub-channels. Each SWUS resource is applicable for a transmitter UE/receiver UE pair.
Only the SWUS 1601 for the {UE_TX1, UE_RX1} pair is active. The other SWUS are inactive.
UE_RX1 monitors SWUS 1601, 1603 in sub-channels 1 and 3 and determines that the SWUS 1601 in sub-channel 1 is active. It hence prepares itself to receive sidelink transmissions from UE_TX1 (e.g. it prepares to receive a DMRS sequence associated with UE_TX1 or monitors a subset of the resource pool's resources that are known to be associated with UE_TX1).
Slot 2:
UE_TX1 transmits PSCCH 1612/PSSCH 1614 to UE_RX1.
Due to the SWUS indication in slot 1, UE_RX1 is awake and receives the sidelink transmission from UE_TX1.

Correspondingly, the second receiver UE, UE_RX2, operates as follows:
Slot 1:
UE_RX2 monitors SWUS 1602, 1604 in sub-channels 2 and 4 and determines that none of its associated SWUS are active.
Only the SWUS 1601 for the {UE_TX1, UE_RX1} pair is active. This does not act to wake up UE_RX2 (since UE_RX2 does not monitor this SWUS resource).
Slot 2:
UE_TX1 transmits PSCCH/PSSCH to UE_RX1.
Due to the SWUS for UE_RX2 being inactive in slot 1, UE_RX2 is asleep during slot 2 of the resource pool and does not monitor the PSCCH/PSSCH transmission to UE_TX1.

According to this example embodiment, two different transmitter UEs can wake up two different receiver UEs. For example, referring to FIG. 16, UE_TX1 can wake up UE_RX1 using the SWUS 1601 on sub-channel 1 while UE_TX2 simultaneously wakes up UE_RX2 using the SWUS resource 1604 on sub-channel 4.

In the above embodiments, the SWUS that are used for transmitter UEs and receiver UEs can be RRC configured.

RRC signalling can assign more than one receiver UE to monitor a particular SWUS resource, in which case the SWUS resource acts as a group sidelink wake up signal.
  For example, UE_RX1 and UE_RX3 can be assigned to monitor SWUS 1601 in sub-channel 1 (referring to FIG. 16).
    If UE_TX1 wishes to transmit to either UE_RX1 or UE_RX3, it transmits SWUS 1601 in sub-channel 1.
    If UE_TX1 transmits to UE_RX1 and transmits SWUS 1601 in sub-channel 1, UE_RX1 will wake up. UE_RX3 will also inadvertently wake up by over-hearing the SWUS 1601.
RRC signalling can assign more than one transmitter UE to transmit using a particular SWUS resource.
  For example, UE_TX1 and UE_TX3 can be assigned to transmit SWUS to receiver UE UE_RX1 1601 in sub-channel 1 (referring to FIG. 16).
    If UE_RX1 receives SWUS in sub-channel 1, it is aware that either UE_TX1 or UE_TX3 wishes to transmit to it (or both).
    Dependent on the signal design (for example if the SWUS comprises an OFDM-based signal that is timing-advanced to within the cyclic prefix), if both UE_TX1 and UE_TX3 both transmit SWUS in sub-channel 1 1601, receiver UE, UE_RX1, receives the composite signal and wakes up, as appropriate.

In other examples some SWUS physical resources may be associated with certain TX_UE to RX_UE pairs while other SWUS resources are not. For example:
  SWUS 1601 on Sub-channel 1 is associated with UE_TX1 and UE_RX1
  SWUS 1602 on Sub-channel 2 is associated with UE_TX1 and UE_RX2
  SWUS 1603 on Sub-channel 3 is associated with other (i.e. the group of UEs other than UE_TX1, UE_RX1 and UE_RX2) transmitter and receiver UEs This example embodiment could be useful to allow for certain SWUS resources to be applied to "unpaired" UEs. As will be appreciated from the above explanation, UE_RX1 is configured to expect communications from UE_TX1, due to an SWUS 1601 being provided for this communication. However, a new UE, UE_TX3, may wish to communicate with the receiver UE, UE_RX1. In this case, UE_TX3 could communicate to UE_RX1 using SWUS 1603 on sub-channel 3 until a communication link has been established between UE_TX3 and UE_RX1, at which stage an SWUS on dedicated physical resources could be defined, for example UE_TX3 and UE_RX1 could use an SWUS 1604 on Sub-channel 4 926.

According to the above example embodiments, an SWUS can indicate which resources within the resource pool will be active. As explained above, in some embodiments different transmitter UEs can use different physical resources for SWUS or different transmitter UEs can use different bit fields within a common SWUS to inform certain UEs or all UEs to receive within a group. Alternatively, separate SWUS are configured with different physical resources within the resource pool: a transmitter UE that transmits in certain physical resources would signal that activity in the corresponding SWUS.

In this embodiment, receiver UEs can change their receiver settings within the resource pool based on SWUS. For example, if SWUS indicates that some slots within the SWUS are inactive, the UE can turn off for those slots. In another example, if SWUS indicates that a restricted number of resources are active within a slot of a resource pool, the UE can sample and decode those resources with a narrower bandwidth.

As will be appreciated the different aspects and features of the embodiments described above may be combined to form different embodiments of the present technique.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A communications device comprising
  transmitter circuitry, and
  controller circuitry configured to configure the transmitter circuitry
    to transmit signals representing data to one or more receiving communications devices via a sidelink interface forming part of a wireless access interface for device to device communications comprising a plurality of resource pool instances, the controller circuitry in combination with the transmitter circuitry being configured
    to transmit or to initiate transmission of a sidelink wake-up signal, SWUS, to the one or more receiving communications devices indicating that the one or more receiving communications devices should prepare to receive the signals representing the data in one of the resource pools, and
    to transmit the signals representing the data in shared channel resources of the one resource pool indicated.

Paragraph 2. A communications device according to paragraph 1, comprising receiver circuitry, wherein the receiver circuitry is configured to receive signals transmitted via a wireless access interface of a wireless communications network, and the transmitter circuitry is configured to transmit signals via the wireless access interface of the wireless communications network, and the SWUS is transmitted by the wireless communications network.

Paragraph 3. A communications device according to paragraph 2, wherein the controller circuitry is configured to control the transmitter circuitry to initiate transmission of the SWUS by controlling the transmitter circuitry to transmit a request to the wireless communications network to transmit the SWUS.

Paragraph 4. A communications device according to paragraph 3, wherein the controller circuitry is configured to control the receiver circuitry to monitor for the transmission of the SWUS by the wireless communications network, and to control the transmitter circuitry to transmit the signals representing the data in the shared channel resources of the one resource pool if the SWUS is transmitted by the wireless communications network indicates that the one or more receiving communications devices should prepare to receive the signals representing the data in the one resource pool.

Paragraph 5. A communications device according to any of paragraphs 1 to 4, wherein the indication of the resources of the shared channel of the one resource pool of the sidelink via which shared channel the signals representing the data will be transmitted is transmitted via a control channel of the one resource pool, the indication of the shared resources being transmitted by the wireless communications network.

Paragraph 6. A communications device according to paragraph 1, wherein the controller circuitry is configured to control the transmitter circuitry to transmit the indication of the resources of the shared channel of the one resource pool of the sidelink via which shared channel the signals representing the data will be transmitted in a control channel of the one resource pool of the sidelink.

Paragraph 7. A communications device according to any of paragraphs 1 to 6, wherein the plurality of the resource pools each comprise a plurality of time slots and a plurality of sub-channels, and the SWUS is transmitted in one or more of the sub-channels in a first of the time slots of the one resource pool.

Paragraph 8. A communications device according to any of paragraphs 1 to 6, wherein the plurality of the resource pools each comprise a plurality of time slots and a plurality of sub-channels, and the SWUS is transmitted in one or more of the sub-channels in each of the time slots of the one resource pool.

Paragraph 9. A communications device according to paragraph 7 or 8, wherein each of the time slots comprises a plurality of Orthogonal Frequency Division Multiplexed, OFDM, symbols and the SWUS is transmitted in one or more of the OFDM symbols at a start of the time slot of the one resource pool.

Paragraph 10. A communications device according to any of paragraphs 6 to 9, wherein the SWUS indicates that the one or more receiving communications devices should receive the data from one or more of a plurality of time slots of the resource pool, the indication of the shared channel resources being transmitted on a control channel on the one or more of the plurality of time slots of the one resource pool.

Paragraph 11. A communications device according to any of paragraphs 1 to 10, wherein the SWUS transmitted in one of the time slots indicates that the one or more receiving communications devices should monitor for signals transmitted on a subsequent time slot of the resource pool to receive the indication of the shared channel resources on the subsequent time slot of the one resource pool.

Paragraph 12. A communications device according to any of paragraphs 1 to 10, wherein the one or more receiving communications device are configured to monitor for the SWUS transmitted in a first of the time slots of the one resource pool, the SWUS being configured to indicate that the communications device should monitor for one or both of signals transmitted in the first time slot or monitor for signals transmitted in a subsequent time slot of the resource pool to receive the indication of the shared channel resources.

Paragraph 13. A communications device according to any of paragraphs 1 to 10, wherein the one resource pool, on which the indication of the resources of the shared channel on which the signals representing the data will be transmitted, is after a resource pool in which the SWUS is transmitted, the SWUS indicating that the one or more receiving communications device should receive the indication of the shared channel resources on the control channel of the one resource pool which occurs after the resource pool on which the SWUS is transmitted.

Paragraph 14. A communications device according to paragraph 10, wherein the controller circuitry is configured with the transmitter circuitry to transmit the SWUS with an indication that the one or more receiving communications device should receive the indication of the shared channel resources on the control channel on one or more of a plurality of time slots of the one resource pool, or to be or to remain in a reduced power state for the plurality of time slots of the one resource pool.

Paragraph 15. A communications device according to paragraph 2, wherein the controller circuitry is configured with the receiver circuitry to detect the SWUS transmitted by the wireless communications network and to control the transmitter circuitry to transmit the indication of the resources of the shared channel of the one resource pool on which the signals representing the data will be transmitted in the control channel of the one resource pool, and then to transmit the signals representing the data in the indicated resources.

Paragraph 16. A communications device according to any of paragraph 6 to 15, wherein the controller circuitry is configured with the transmitter circuitry to transmit the SWUS with an indication identifying the communications device which transmits the SWUS.

Paragraph 17. A communications device according to any of paragraph 6 to 15, wherein the controller circuitry is configured with the transmitter circuitry to transmit the SWUS with an indication that the SWUS commonly identifies a plurality of communications devices, the SWUS identifying that one of the plurality of the communications devices transmitted the SWUS.

Paragraph 18. A communications device according to any of paragraphs 1 to 17, wherein the SWUS comprises a Physical Random Access Channel, or a Demodulation Reference Signal.

Paragraph 19. A communications device according to paragraph 1 to 18, wherein the plurality of the resource pools each comprise physical resources formed from a plurality of time slots and a plurality of sub-channels, and at least part of the physical resources of one or more of the sub-channels and one or more of the time slots are designated as one or more SWUS occasions, at least one of the SWUS occasions being dedicated to one or more communications devices for transmitting an SWUS, the communications device being identified by the SWUS occasion in which the SWUS is transmitted.

Paragraph 20. A communications device according to any of paragraphs 1 to 18, wherein one or more of the plurality of resource pools comprise physical resources formed from a plurality of time slots and a plurality of sub-channels, and at least part of the physical resources of one or more of the sub-channels and one or more of the time slots are designated as one or more SWUS occasions and the SWUS transmitted by the wireless communications network in one of the one or more SWUS occasions is configured to identify the communications devices which will transmit the signals representing the data in the one resource pool.

Paragraph 21. A communications device according to paragraph 20 wherein the SWUS includes a list of a plurality of communications devices which will transmit signals representing data in a resource pool, the list including the communications device which will transmit in the one resource pool.

Paragraph 22. A communications device according to any of paragraphs 6 to 18, wherein the plurality of the resource pools each comprise physical resources formed from a plurality of time slots and a plurality of sub-channels, and at least part of the physical resources of one or more of the sub-channels and one or more of the time slots are designated as one or more SWUS occasions, at least one of the SWUS occasions being dedicated to the communications devices for transmitting an SWUS, the communications device being identified by the SWUS occasion in which the SWUS is transmitted.

Paragraph 23. A communications device according to paragraph 22, wherein the one or more SWUS occasions is dedicated to one of the one or more receiving communications device and a transmitting communications device.

Paragraph 24. A communications device according to paragraph 23, wherein the controller circuitry is configured with the receiver circuitry to receive signalling information indicating one or more of the SWUS occasions which are dedicated to the communications device to transmit the SWUS.

Paragraph 25. A communications device according to paragraph 23 or 24, wherein the signalling information is received using radio resource configuration signalling.

Paragraph 26. A communications device according to any of paragraphs 8 to 16, wherein the plurality of the resource pools each comprise physical resources formed from a plurality of time slots and a plurality of sub-channels, and at least part of the physical resources of one or more of the sub-channels and one or more of the time slots are designated as one or more SWUS occasions, and an SWUS received from at least one of the SWUS occasions is associated with the physical resources of one or more sub-channels and one or more time-slots, and the controller circuitry is configured with the transmitter circuitry to transmit the signals representing the data from the physical resources associated with the SWUS occasion from which the SWUS is transmitted.

Paragraph 27. A communications device comprising
receiver circuitry, and
controller circuitry configured to configure the receiver circuitry
to receive signals representing data from another communications devices via a sidelink interface forming part of a wireless access interface for device to device communications comprising a plurality of resource pool instances, the controller circuitry in combination with the receiver circuitry being configured
to monitor physical resources of the one resource pool of the sidelink interface for a sidelink wake-up signal, SWUS, indicating that the communications device should configure the receiver circuitry either to receive the signals representing the data from the other communications device, or to enter or to remain in a reduced power state, and if the SWUS is detected and indicates that the communications device should be configured to receive the data,
to configure the receiver circuitry to receive an indication of resources of a shared channel of the one resource pool of the sidelink via which shared channel the signals representing the data will be transmitted, and
to receive the signals representing the data from the shared channel resources of the one resource pool indicated in the control channel of the one resource pool, else if the SWUS is not detected or the SWUS indicates that the communications device should enter or to remain in a reduced power state, configuring the receiver circuitry to be or to remain in a reduced power state.

Paragraph 28. A communications device according to any paragraph 27, wherein the plurality of the resource pools each comprise a plurality of time slots and a plurality of sub-channels, and the SWUS is transmitted in one or more of the sub-channels in a first of the time slots of the one resource pool.

Paragraph 29. A communications device according to paragraph 27, wherein the plurality of the resource pools each comprise a plurality of time slots and a plurality of sub-channels, and the SWUS is transmitted in one or more of the sub-channels in each of the time slots of the one resource pool.

Paragraph 30. A communications device according to paragraph 28 or 29, wherein each of the time slots comprises a plurality of Orthogonal Frequency Division Multiplexed, OFDM, symbols and the SWUS is transmitted in one or more of the OFDM symbols at a start of the time slot of the one resource pool.

Paragraph 31. A communications device according to any of paragraphs 27 to 30, wherein the SWUS indicates that the communications device should configure the receiver circuitry to receive the data from one or more of a plurality of time slots of the resource pool, the indication of the shared channel resources being transmitted on a control channel of the one resource pool of the sidelink on the one or more of the plurality of time slots of the one resource pool.

Paragraph 32. A communications device according to any of paragraphs 27 to 31, wherein the SWUS transmitted in one of the time slots indicates that the communications device should configure the receiver circuitry to monitor for signals transmitted on a subsequent time slot of the resource pool to receive the indication of the shared channel resources on the subsequent time slot of the one resource pool.

Paragraph 33. A communications device according to any of paragraphs 27 to 32, wherein the receiver circuitry is configured to monitor for the SWUS transmitted in a first of the time slots of the one resource pool, the SWUS being configured either to indicate that the communications device should monitor for signals transmitted in the first time slot or monitor for signals transmitted in a subsequent time slot of the resource pool to receive the indication of the shared channel resources.

Paragraph 34. A communications device according to any of paragraphs 27 to 32, wherein the one resource pool, on which the indication of the resources of the shared channel on which the signals representing the data will be transmitted, is after a resource pool in which the SWUS is transmitted, the SWUS indicating that the controller circuitry should configure the receiver circuitry to receive the indication of the shared channel resources on the control channel of the one resource pool which occurs after the resource pool on which the SWUS is transmitted.

Paragraph 35. A communications device according to paragraph 27 to 32, wherein the SWUS indicates that the controller circuitry should configure the receiver circuitry either to receive the indication of the shared channel resources on the control channel on one or more of a plurality of time slots of the one resource pool, or to be or to remain in a reduced power state for the plurality of time slots of the one resource pool.

Paragraph 36. A communications device according to any of paragraphs 27 to 35, wherein the SWUS is transmitted by the wireless access network.

Paragraph 37. A communications device according to paragraph 36, wherein the indication of the resources of the shared channel of the one resource pool on which the signals representing the data will be transmitted is transmitted in a control channel of the one resource pool, the indication of the shared resources being transmitted by the wireless access network.

Paragraph 38. A communications device according to any of paragraph 27 to 37, wherein the controller circuitry is configured with the receiver circuitry with an indication for identifying the communications device which transmits the SWUS from an indication included with the SWUS.

Paragraph 39. A communications device according to any of paragraph 27 to 38, wherein the controller circuitry is configured with the receiver circuitry with an indication that the SWUS commonly identifies a plurality of communications devices, the SWUS identifying that one of the plurality of the communications devices transmitted the SWUS.

Paragraph 40. A communications device according to any of paragraphs 27 to 39, wherein the SWUS comprises a Physical Random Access Channel, or a Demodulation Reference Signal.

Paragraph 41. A communications device according to any of paragraphs 27 to 40, wherein the plurality of the resource pools each comprise physical resources formed from a plurality of time slots and a plurality of sub-channels, and at least part of the physical resources of one or more of the sub-channels and one or more of the time slots are designated as one or more SWUS occasions, at least one of the SWUS occasions being dedicated to one or more communications devices for transmitting an SWUS, the communications device being identified by the SWUS occasion in which the SWUS is transmitted.

Paragraph 42. A communications device according to any of paragraphs 27 to 40, wherein one or more of the plurality of resource pools comprise physical resources formed from a plurality of time slots and a plurality of sub-channels, and at least part of the physical resources of one or more of the sub-channels and one or more of the time slots are designated as one or more SWUS occasions and the SWUS transmitted by the wireless communications network in one of the one or more SWUS occasions is configured to identify the communications devices which will transmit the signals representing the data in the one resource pool.

Paragraph 43. A communications device according to paragraph 42, wherein the SWUS includes a list of a plurality of communications devices which will transmit signals representing data in a resource pool.

Paragraph 44. A communications device according to any of paragraphs 27 to 40, wherein the plurality of the resource pools each comprise physical resources formed from a plurality of time slots and a plurality of sub-channels, and at least part of the physical resources of one or more of the sub-channels and one or more of the time slots are designated as one or more SWUS occasions, at least one of the SWUS occasions being dedicated to the communications devices for receiving an SWUS, the communications device being identified by the SWUS occasion in which the SWUS is received.

Paragraph 45. A communications device according to paragraph 27 to 44, wherein the one or more SWUS occasions is dedicated to the receiving communications device and a transmitting communications device.

Paragraph 46. A communications device according to paragraph 44 or 45, wherein the controller circuitry is configured in combination with the receiver circuitry to configure the receiver circuitry to be or to remain in a reduced power state for a resource pool if an SWUS has not been received from any of the one or more SWUS occasions which are dedicated to the receiving communications device.

Paragraph 47. A communications device according to any of paragraphs 27 to 40, wherein a plurality of SWUS occasions are provided in the one resource pool, each of the plurality of SWUS occasions being dedicated to different transmitting communications devices, and the controller circuitry is configured with the receiver circuitry to prioritise receiving signals from one of the plurality of transmitting communications devices if more than one SWUS is received from different SWUS occasions in the one resource pool.

Paragraph 48. A communications device according to any of paragraphs 27 to 40, wherein the plurality of the resource pools each comprise physical resources formed from a plurality of time slots and a plurality of sub-channels, and at least part of the physical resources of one or more of the sub-channels and one or more of the time slots are designated as one or more SWUS occasions, and the controller circuitry is configured with the receiver circuitry to receive signalling information configuring the communications device to monitor one or more of the SWUS occasions for receiving the SWUS.

Paragraph 49. A communications device according to any of paragraphs 47 or 48, wherein the controller circuitry is configured with the receiver circuitry to receive signalling information indicating one or more of the SWUS occasions which are dedicated to the communications device to transmit the SWUS.

Paragraph 50. A communications device according to paragraph 47 or 48, wherein the signalling information is received using radio resource configuration signalling.

Paragraph 51. A communications device according to any of paragraphs 27 to 40, wherein the plurality of the resource pools each comprise physical resources formed from a plurality of time slots and a plurality of sub-channels, and at least part of the physical resources of one or more of the sub-channels and one or more of the time slots are designated as one or more SWUS occasions, and an SWUS received from at least one of the SWUS occasions is associated with the physical resources of one or more sub-channels and one or more time-slots, and the controller circuitry is configured with the receiver circuitry to receive the signals representing the data from the physical resources associated with the SWUS occasion from which the SWUS is received.

Paragraph 52. A method of transmitting data by a communications device, the method comprising transmitting signals representing data to one or more receiving communications devices via a sidelink interface forming part of a wireless access interface for device to device communications comprising a plurality of resource pool instances, the transmitting the signals representing the data comprising transmitting or initiating transmission of a sidelink wake-up signal, SWUS, to the one or more receiving communications devices indicating that the one or more receiving communications devices should prepare to receive the signals representing the data in one of the resource pools, and transmitting the signals representing the data in shared channel resources of the one resource pool indicated.

Paragraph 53. A method of receiving data by a communications device, the method comprising receiving signals representing data from another communications devices via a sidelink interface forming part of a wireless access interface for device to device communications comprising a plurality of resource pool instances, the receiving the signals representing the data comprising monitoring physical resources of the one resource pool of the sidelink interface for a sidelink wake-up signal, SWUS, indicating that the communications device should configure the receiver circuitry either to receive the signals representing the data from the other communications device, or to enter or to remain in a reduced power state, and if the SWUS is detected and indicates that the communications device should be configured to receive the data, receiving an indication of resources of a shared channel of the one resource pool of the sidelink via which shared channel the signals representing the data will be transmitted, the indication being received from a control channel of the one resource pool of the sidelink, and receiving the signals representing the data from the shared channel resources of the one resource pool indicated, else if the SWUS is not detected or the SWUS indicates that the communications device should enter or to remain in a reduced power state, configuring receiver circuitry to be or to remain in a reduced power state.

Paragraph 54. An infrastructure equipment forming part of a wireless communications network, the infrastructure equipment comprising receiver circuitry configured to receive signals transmitted by one or more communications devices via a wireless access interface provided by the wireless communications network, transmitter circuitry configured to transmit signals to one or more communications devices via the wireless access interface, and controller circuitry configured to control the receiver circuitry to receive an indication to initiate transmission of a sidelink wake-up signal, SWUS, to the one or more receiving communications devices indicating that the one or more receiving communications devices should prepare to receive the signals representing the data in one of the resource pools, and to transmit the SWUS to the one or more receiving communications devices.

Paragraph 55. A method of operating an infrastructure equipment forming part of a wireless communications network, the method comprising receiving an indication to initiate transmission of a sidelink wake-up signal, SWUS, to the one or more receiving communications devices indicating that the one or more receiving communications devices should prepare to receive the signals representing the data in one of the resource pools, and transmitting the SWUS to the one or more receiving communications devices.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.
[2] RP-172834, "Revised WID on New Radio Access Technology," NTT DOCOMO, RAN #78.
[3] R1-1708311, "Idle Mode Power Efficiency Reduction," Sierra Wireless, RAN1 #89.
[4] TR 38.840, "NR: Study on UE Power Saving (Release 16, v0.1.0)", 3GPP, November 2018.
[5] TS 36.300, "Evolved Universal Terrestrial Radio Access (E-UTRA) and Evolved Universal Terrestrial Radio Access Network (E-UTRAN); Overall description; Stage 2 (Release 16, v16.0.0)", 3GPP, January 2020.
[6] TS 38.321, "NR: Medium Access Control (MAC) Protocol Specification (Release 15, v15.4.0)", 3GPP, January 2019.
[7] 3GPP TR38.840 "Study on UE power saving (Release 16)"

What is claimed is:

1. A communications device comprising
transmitter circuitry, and
controller circuitry configured to configure the transmitter circuitry
to transmit signals representing data to one or more receiving communications devices via a sidelink interface forming part of a wireless access interface for device to device communications comprising a plurality of resource pool instances, the controller circuitry in combination with the transmitter circuitry being configured
to transmit or to initiate transmission of a sidelink wake-up signal (SWUS) to the one or more receiving communications devices indicating that the one or more receiving communications devices should prepare to receive the signals representing the data in one of the resource pools, and
to transmit the signals representing the data in shared channel resources of the one resource pool indicated, wherein the plurality of the resource pools each comprise a plurality of time slots and a plurality of sub-channels, and the SWUS is transmitted in one or more of the sub-channels in a first of the time slots of the one resource pool.

2. A communications device according to claim 1, comprising receiver circuitry, wherein the receiver circuitry is configured to receive signals transmitted via a wireless access interface of a wireless communications network, and the transmitter circuitry is configured to transmit signals via the wireless access interface of the wireless communications network, and the SWUS is transmitted by the wireless communications network.

3. A communications device according to claim 2, wherein the controller circuitry is configured to control the transmitter circuitry to initiate transmission of the SWUS by controlling the transmitter circuitry to transmit a request to the wireless communications network to transmit the SWUS.

4. A communications device according to claim 3, wherein the controller circuitry is configured to control the receiver circuitry to monitor for the transmission of the SWUS by the wireless communications network, and to control the transmitter circuitry to transmit the signals representing the data in the shared channel resources of the one resource pool if the SWUS is transmitted by the wireless communications network indicates that the one or more receiving communications devices should prepare to receive the signals representing the data in the one resource pool.

5. A communications device according to claim 1, wherein the indication of the resources of the shared channel of the one resource pool of the sidelink via which shared channel the signals representing the data will be transmitted is transmitted via a control channel of the one resource pool, the indication of the shared resources being transmitted by the wireless communications network.

6. A communications device according to claim 1, wherein the controller circuitry is configured to control the transmitter circuitry to transmit the indication of the resources of the shared channel of the one resource pool of the sidelink via which shared channel the signals representing the data will be transmitted in a control channel of the one resource pool of the sidelink.

7. A communications device according to claim 1, wherein the SWUS is transmitted in one or more of the sub-channels in each of the time slots of the one resource pool.

8. A communications device according to claim 6, wherein the SWUS indicates that the one or more receiving communications devices should receive the data from one or more of a plurality of time slots of the resource pool, the indication of the shared channel resources being transmitted on a control channel on the one or more of the plurality of time slots of the one resource pool.

9. A communications device according to claim 1, wherein the SWUS transmitted in one of the time slots indicates that the one or more receiving communications devices should monitor for signals transmitted on a subsequent time slot of the resource pool to receive the indication of the shared channel resources on the subsequent time slot of the one resource pool.

10. A communications device according to claim 1, wherein the one or more receiving communications device are configured to monitor for the SWUS transmitted in a first of the time slots of the one resource pool, the SWUS being configured to indicate that the communications device should monitor for one or both of signals transmitted in the first time slot or monitor for signals transmitted in a subsequent time slot of the resource pool to receive the indication of the shared channel resources.

11. A communications device according to claim 1, wherein the one resource pool, on which the indication of the resources of the shared channel on which the signals representing the data will be transmitted, is after a resource pool in which the SWUS is transmitted, the SWUS indicating that the one or more receiving communications device should receive the indication of the shared channel resources on the control channel of the one resource pool which occurs after the resource pool on which the SWUS is transmitted.

12. A communications device according to claim 2, wherein the controller circuitry is configured with the receiver circuitry to detect the SWUS transmitted by the wireless communications network and to control the transmitter circuitry to transmit the indication of the resources of the shared channel of the one resource pool on which the signals representing the data will be transmitted in the control channel of the one resource pool, and then to transmit the signals representing the data in the indicated resources.

13. A communications device according to claim 6, wherein the controller circuitry is configured with the transmitter circuitry to transmit the SWUS with an indication identifying the communications device which transmits the SWUS.

14. A communications device according to claim 6, wherein the controller circuitry is configured with the transmitter circuitry to transmit the SWUS with an indication that the SWUS commonly identifies a plurality of communications devices, the SWUS identifying that one of the plurality of the communications devices transmitted the SWUS.

15. A communications device according to claim 1, wherein the SWUS comprises a Physical Random Access Channel, or a Demodulation Reference Signal.

16. A communications device according to claim 1, wherein at least part of the physical resources of one or more of the sub-channels and one or more of the time slots are designated as one or more SWUS occasions, at least one of the SWUS occasions being dedicated to one or more communications devices for transmitting an SWUS, the communications device being identified by the SWUS occasion in which the SWUS is transmitted.

17. A communications device according to claim 1, at least part of the physical resources of one or more of the sub-channels and one or more of the time slots are designated as one or more SWUS occasions and the SWUS transmitted by the wireless communications network in one of the one or more SWUS occasions is configured to identify the communications devices which will transmit the signals representing the data in the one resource pool.

18. A method of transmitting data by a communications device, the method comprising:
  transmitting signals representing data to one or more receiving communications devices via a sidelink interface forming part of a wireless access interface for device to device communications comprising a plurality of resource pool instances, the transmitting the signals representing the data comprising
  transmitting or initiating transmission of a sidelink wake-up signal (SWUS) to the one or more receiving communications devices indicating that the one or more receiving communications devices should prepare to receive the signals representing the data in one of the resource pools, and
  transmitting the signals representing the data in shared channel resources of the one resource pool indicated, wherein the plurality of the resource pools each comprise a plurality of time slots and a plurality of sub-channels, and the SWUS is transmitted in one or more of the sub-channels in a first of the time slots of the one resource pool.

19. An infrastructure equipment forming part of a wireless communications network, the infrastructure equipment comprising:

receiver circuitry configured to receive signals transmitted by one or more communications devices via a wireless access interface provided by the wireless communications network, transmitter circuitry configured to transmit signals to one or more communications devices via the wireless access interface, and controller circuitry configured to control the receiver circuitry
- to receive an indication to initiate transmission of a sidelink wake-up signal (SWUS) to the one or more receiving communications devices indicating that the one or more receiving communications devices should prepare to receive the signals representing the data in one of a plurality of resource pools, and
- to transmit the SWUS to the one or more receiving communications devices, wherein the plurality of the resource pools each comprise a plurality of time slots and a plurality of sub-channels, and the SWUS is transmitted in one or more of the sub-channels in a first of the time slots of the one resource pool.

* * * * *